US010375186B2

(12) United States Patent
Kannan et al.

(10) Patent No.: US 10,375,186 B2
(45) Date of Patent: *Aug. 6, 2019

(54) FREQUENT SITES BASED ON BROWSING PATTERNS

(71) Applicant: Microsoft Technology Licensing, LLC, Redmond, WA (US)

(72) Inventors: Vishwac Sena Kannan, Redmond, WA (US); Tanvi Saumil Surti, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,562

(22) Filed: May 19, 2016

(65) Prior Publication Data

US 2016/0269498 A1 Sep. 15, 2016

Related U.S. Application Data

(63) Continuation of application No. 13/923,267, filed on Jun. 20, 2013, now Pat. No. 9,374,431.

(51) Int. Cl.
*H04L 29/08* (2006.01)
*G06F 16/954* (2019.01)
(52) U.S. Cl.
CPC ............ *H04L 67/22* (2013.01); *G06F 16/954* (2019.01); *H04L 67/02* (2013.01)
(58) Field of Classification Search
USPC ........................................................ 709/224
See application file for complete search history.

(56) References Cited

U.S. PATENT DOCUMENTS 6,564,213 B1    5/2003  Ortega et al.
6,745,367 B1 *  6/2004  Bates ...................... G06F 21/62
                                                715/205

(Continued)

FOREIGN PATENT DOCUMENTS

CN          102915342           2/2013

OTHER PUBLICATIONS

"Corrected Notice of Allowance", U.S. Appl. No. 13/923,267, dated May 27, 2016, 2 pages.

(Continued)

*Primary Examiner* — Hermon Asres

(57) ABSTRACT

Various embodiments provide a frequent sites module which is designed to generate frequent sites for a user that include websites that are relevant to the user based on browsing patterns of the user. In one or more embodiments, the frequent sites are generated from user-engagement data that indicates engagement by the user with websites identified in the user's browsing history. A web platform, e.g., a web browser, can display the frequent sites for the user in a frequent sites user interface container to enable the user to efficiently navigate to the websites that are relevant to the user by selection of websites from the frequent sites user interface container. Various embodiments describe other aspects of frequent sites based on browsing patterns, including multiple-device frequent sites, device-specific frequent sites, domain-specific frequent sites, URL-specific frequent sites, decaying of frequent sites, recent frequent sites, and contextual frequent sites.

13 Claims, 12 Drawing Sheets

(56) References Cited

U.S. PATENT DOCUMENTS

| | | |
|---|---|---|
| 7,360,171 B2 | 4/2008 | Ruthfield et al. |
| 7,437,312 B2 | 10/2008 | Bhatia et al. |
| 7,548,915 B2 | 6/2009 | Ramer et al. |
| 7,603,360 B2 | 10/2009 | Ramer et al. |
| 7,809,744 B2 | 10/2010 | Nevidomski et al. |
| 7,818,332 B2 | 10/2010 | Olds et al. |
| 7,979,415 B2 | 7/2011 | Shen et al. |
| 8,027,990 B1 | 9/2011 | Mysen et al. |
| 8,050,675 B2 | 11/2011 | Ramer et al. |
| 8,069,182 B2 | 11/2011 | Pieper |
| 8,082,278 B2 | 12/2011 | Agrawal et al. |
| 8,108,778 B2 | 1/2012 | Athsani et al. |
| 8,117,208 B2 | 2/2012 | Chang et al. |
| 8,135,616 B2 | 3/2012 | Callaghan et al. |
| 8,204,897 B1 | 6/2012 | Djabarov et al. |
| 8,209,344 B2 | 6/2012 | Ramer et al. |
| 8,326,859 B2 | 12/2012 | Paek et al. |
| 8,332,748 B1 | 12/2012 | Karam |
| 8,341,157 B2 | 12/2012 | Schulman |
| 8,386,955 B1 | 2/2013 | Weber et al. |
| 8,601,019 B1 | 12/2013 | Weininger et al. |
| 8,631,004 B2 | 1/2014 | Mishne et al. |
| 8,639,684 B2 | 1/2014 | Djabarov |
| 8,671,106 B1 | 3/2014 | Lee et al. |
| 8,799,276 B1 | 8/2014 | Hyatt et al. |
| 9,092,527 B2 | 7/2015 | Shapira et al. |
| 9,244,985 B1 | 1/2016 | Haugen et al. |
| 9,355,140 B1 | 5/2016 | Bousquet |
| 9,374,431 B2 | 6/2016 | Kannan et al. |
| 9,489,458 B1 | 11/2016 | Haugen et al. |
| 2003/0083938 A1 | 5/2003 | Smith et al. |
| 2003/0126560 A1 | 7/2003 | Kurapati et al. |
| 2003/0135582 A1 | 7/2003 | Allen et al. |
| 2004/0186774 A1 | 9/2004 | Lee |
| 2005/0028104 A1* | 2/2005 | Apparao ............... G06F 16/437 715/738 |
| 2005/0114881 A1* | 5/2005 | Philyaw ................. G06Q 30/02 725/25 |
| 2006/0064411 A1 | 3/2006 | Gross |
| 2006/0173825 A1 | 8/2006 | Hess et al. |
| 2006/0242586 A1 | 10/2006 | McGlinchey et al. |
| 2006/0248078 A1 | 11/2006 | Gross et al. |
| 2006/0288015 A1 | 12/2006 | Schirripa et al. |
| 2007/0011616 A1* | 1/2007 | Ording ................ G06F 16/9566 715/738 |
| 2007/0050251 A1 | 3/2007 | Jain et al. |
| 2007/0100650 A1 | 5/2007 | Ramer et al. |
| 2007/0100799 A1 | 5/2007 | Rose et al. |
| 2007/0100915 A1 | 5/2007 | Rose |
| 2007/0185847 A1 | 8/2007 | Budzik et al. |
| 2007/0226058 A1 | 9/2007 | Lorenzen et al. |
| 2007/0276790 A1 | 11/2007 | Walsh et al. |
| 2007/0294240 A1 | 12/2007 | Steele et al. |
| 2008/0022216 A1 | 1/2008 | Sugimura |
| 2008/0104037 A1 | 5/2008 | Bierner |
| 2008/0109491 A1 | 5/2008 | Gupta |
| 2008/0154859 A1 | 6/2008 | Chi |
| 2008/0172374 A1 | 7/2008 | Wolosin et al. |
| 2008/0189281 A1 | 8/2008 | Cancel et al. |
| 2008/0288492 A1 | 11/2008 | Gemmell et al. |
| 2009/0006974 A1* | 1/2009 | Harinarayan ..... G06F 17/30867 715/738 |
| 2009/0019002 A1 | 1/2009 | Boulis |
| 2009/0083232 A1 | 3/2009 | Ives et al. |
| 2009/0106224 A1 | 4/2009 | Roulland et al. |
| 2009/0112848 A1 | 4/2009 | Kunjithapatham et al. |
| 2009/0171929 A1 | 7/2009 | Jing et al. |
| 2009/0177744 A1 | 7/2009 | Marlow et al. |
| 2009/0210806 A1 | 8/2009 | Dodson et al. |
| 2009/0271390 A1 | 10/2009 | Zheng et al. |
| 2009/0313100 A1 | 12/2009 | Ingleshwar |
| 2010/0010959 A1 | 1/2010 | Broder et al. |
| 2010/0057698 A1 | 3/2010 | Prasad Kantamneni et al. |
| 2010/0131835 A1 | 5/2010 | Kumar et al. |
| 2010/0146012 A1 | 6/2010 | Beaudreau et al. |
| 2010/0169364 A1 | 7/2010 | Hardt |
| 2010/0180001 A1 | 7/2010 | Hardt |
| 2010/0205202 A1 | 8/2010 | Yang et al. |
| 2010/0312782 A1 | 12/2010 | Li et al. |
| 2011/0035397 A1 | 2/2011 | Joshi et al. |
| 2011/0087686 A1 | 4/2011 | Brewer et al. |
| 2011/0093488 A1 | 4/2011 | Amacker et al. |
| 2011/0107242 A1 | 5/2011 | Paek et al. |
| 2011/0161311 A1 | 6/2011 | Mishne et al. |
| 2011/0184981 A1 | 7/2011 | Lu et al. |
| 2011/0191364 A1 | 8/2011 | LeBeau et al. |
| 2011/0202520 A1 | 8/2011 | Teran et al. |
| 2011/0202876 A1 | 8/2011 | Badger et al. |
| 2011/0218862 A1 | 9/2011 | Langston et al. |
| 2011/0225155 A1 | 9/2011 | Roulland et al. |
| 2011/0264648 A1 | 10/2011 | Gulik et al. |
| 2011/0295952 A1 | 12/2011 | Buyukkokten et al. |
| 2011/0320423 A1 | 12/2011 | Gemmell et al. |
| 2012/0005201 A1 | 1/2012 | Ebanks |
| 2012/0059838 A1 | 3/2012 | Berntson et al. |
| 2012/0066645 A1 | 3/2012 | Laurie et al. |
| 2012/0084291 A1 | 4/2012 | Chung et al. |
| 2012/0123857 A1 | 5/2012 | Surve et al. |
| 2012/0131032 A1 | 5/2012 | Rakshit |
| 2012/0137201 A1 | 5/2012 | White et al. |
| 2012/0144317 A1 | 6/2012 | Balasubramanian et al. |
| 2012/0158461 A1 | 6/2012 | Aldrey et al. |
| 2012/0197837 A1 | 8/2012 | Badros et al. |
| 2012/0246165 A1 | 9/2012 | Batraski et al. |
| 2012/0265647 A1 | 10/2012 | Negrillo et al. |
| 2012/0265779 A1 | 10/2012 | Hsu et al. |
| 2012/0265787 A1 | 10/2012 | Hsu et al. |
| 2012/0284253 A9 | 11/2012 | Ghosh et al. |
| 2012/0296743 A1 | 11/2012 | Velipasaoglu et al. |
| 2012/0316955 A1 | 12/2012 | Panguluri et al. |
| 2012/0323828 A1 | 12/2012 | Sontag et al. |
| 2013/0036109 A1 | 2/2013 | Kulick et al. |
| 2013/0054631 A1 | 2/2013 | Govani et al. |
| 2013/0073509 A1 | 3/2013 | Burkard et al. |
| 2013/0275456 A1 | 10/2013 | Cheng et al. |
| 2013/0282749 A1 | 10/2013 | Batraski et al. |
| 2014/0006399 A1* | 1/2014 | Vasudevan .......... G06F 16/9535 707/737 |
| 2014/0149932 A1 | 5/2014 | Wilder et al. |
| 2014/0156262 A1 | 6/2014 | Yuen et al. |
| 2014/0280015 A1 | 9/2014 | Marantz et al. |
| 2014/0280092 A1 | 9/2014 | Marantz et al. |
| 2014/0280093 A1 | 9/2014 | Marantz et al. |
| 2014/0282136 A1 | 9/2014 | Marantz et al. |
| 2014/0379893 A1 | 12/2014 | Kannan et al. |
| 2015/0201040 A1* | 7/2015 | Horling ............... H04L 67/1095 709/203 |

OTHER PUBLICATIONS

"Final Office Action", U.S. Appl. No. 13/911,844, dated Jul. 15, 2016, 22 pages.

"Final Office Action", U.S. Appl. No. 13/904,887, dated Aug. 25, 2016, 24 pages.

"Final Office Action", U.S. Appl. No. 12/610,392, dated Apr. 27, 2012, 8 pages.

"Final Office Action", U.S. Appl. No. 13/904,887, dated Aug. 13, 2015, 21 pages.

"Final Office Action", U.S. Appl. No. 13/917,260, dated Jul. 29, 2015, 30 pages.

"Final Office Action", U.S. Appl. No. 13/923,267, dated Apr. 10, 2015, 16 pages.

"Final Office Action", U.S. Appl. No. 13/923,267, dated Sep. 23, 2014, 14 pages.

"Guide Software Release 6.8", Available at: https://web.archive.org/web/20130118092548/https://developers.google.com/search-appliance/documentation/68/NewFeatures, Oct. 2010, 7 pages.

"International Preliminary Report on Patentability", Application No. PCT/US2013/061088, dated Jan. 15, 2016, 7 pages.

"International Search Report and Written Opinion", Application No. PCT/US2014/028318, dated Nov. 19, 2014, 10 Pages.

(56) References Cited

OTHER PUBLICATIONS

"International Search Report and Written Opinion", Application No. PCT/US2013/061088, dated Jul. 30, 2015, 12 pages.
"International Search Report and Written Opinion", Application No. PCT/CN2013/072599, dated Dec. 19, 2013, 13 Pages.
"International Search Report and Written Opinion", Application No. PCT/US2014/028993, dated Sep. 25, 2014, 8 pages.
"International Search Report and Written Opinion", Application No. PCT/US2014/028554, dated Dec. 5, 2014, 8 pages.
"International Search Report", Application No. PCT/US2015/061088, dated Nov. 24, 2015, 5 pages.
"Mobile Search Just Got a Lot Easier", retrieved from <http://mobile.yahoo.com/onesearch/shortcut> on Jul. 7, 2009, 2009, 1 page.
"Non-Final Office Action", U.S. Appl. No. 13/923,267, dated Jul. 8, 2014, 14 pages.
"Non-Final Office Action", U.S. Appl. No. 12/610,392, dated Dec. 14, 2011, 7 pages.
"Non-Final Office Action", U.S. Appl. No. 13/839,395, dated Feb. 11, 2015, 21 pages.
"Non-Final Office Action", U.S. Appl. No. 13/904,887, dated Mar. 12, 2015, 18 pages.
"Non-Final Office Action", U.S. Appl. No. 13/904,887, dated Apr. 21, 2016, 28 pages.
"Non-Final Office Action", U.S. Appl. No. 13/911,844, dated Nov. 3, 2015, 18 pages.
"Non-Final Office Action", U.S. Appl. No. 13/917,260, dated Feb. 26, 2015, 28 pages.
"Non-Final Office Action", U.S. Appl. No. 13/917,260, dated Apr. 20, 2016, 31 pages.
"Non-Final Office Action", U.S. Appl. No. 13/923,267, dated Jan. 2, 2015, 14 pages.
"Notice of Allowance", U.S. Appl. No. 12/610,392, dated Aug. 8, 2012, 16 pages.
"Notice of Allowance", U.S. Appl. No. 13/923,267, dated Feb. 12, 2016, 14 pages.
"PCT Application", Application No. PCT/CN2013/072599, dated Mar. 13, 2013, 45 pages.
"Second Written Opinion", Application No. PCT/US2013/061088, dated Nov. 23, 2015, 6 pages.
"Supplemental Notice of Allowance", U.S. Appl. No. 12/610,392, dated Aug. 27, 2012, 15 pages.
"Using Auto-Suggest", Yahoo! Small Business Help. Retrieved from: https://web.archive.org/web/20130823151052/http://help.yahoo.com/l/us/yahoo/smallbusiness/store/promote/tools/tools-54.html#, Aug. 23, 2013, 1 page.
Beld,"Google Using Knowledge Graph on People Search", Retrieved at: http://www.stateofdigital.com/google-using-knowledge-graph-on-people-search/, Jul. 19, 2012, 2 pages.
Constine,"Why Google+ Doesn't Care If You Never Come Back", Retrieved at: http://techcrunch.com/2012/02/28/no-more-no-more-no-more-no-more/, Feb. 28, 2012, 2 pages.
Harrison,"Spokeo 5.0 Sneak Preview", Retrieved at: http;/www.spokeo.com/blog/2010/11/spokeo-5-sneak-preview, Nov. 10, 2010, 2 pages.
Hennkens,"Facebook Announces Graph Search Preview", Retrieved at: https://www.intouchsol.com/blog/facebook-announces-graph-search-preview, Feb. 21, 2013, 5 pages.
Kolba,"Query Intent Expression for Search in an Embedded Application Context", U.S. Appl. No. 13/904,887, May 29, 2013, 76 pages.
Li,"Learning Query Intent from Regularized Click Graphs", Proceedings of the 31st Annual International ACM SIGIR Conference on Research and Development in Information Retrieval, Singapore, pp. 339-346, Jul. 2008, 8 pages.
Li,"Modeling Category Viewership of Web Users with Multivariate Count Models", Retrieved from <http://www.andrew.cmu.edu/user/alm3/papers/web%20category%20viewership.pdf>, Jul. 15, 2002, 34 pages.
Marantz,"Search Intent Preview, Disambiguation, and Refinement", Application No. PCT/CN2013/072599, May 14, 2013, 43 pages.
Martinez-Romo,"Web People Search Disambiguation using Language Model Techniques", Apr. 2009, 5 pages.
Osterhoff,"Widen the Peepholes! Entity-based Auto-Suggestion as a Rich and Yet Immediate Starting Point for Exploratory Search", Proceedings of Interaction and Visualization in Data Web, Sep. 20, 2012, 8 pages.
Pitler,"Using Word-Sense Disambiguation Methods to ClassifyWeb Queries by Intent", Proceedings of the 2009 Conference on Empirical Methods in Natural Language Processing, pp. 1428-1436, Singapore, Aug. 6-7, 2009., Aug. 2009, pp. 1428-1436.
Rode,"Using Query Profiles for Clarification", In Proceedings of the 28th European Conference on IR Research,, Apr. 10, 2006, 12 pages.
Romer,"Real-Time Search for Real-World Entities: A Survey", In Proceedings of IEEE, vol. 98, Issue 11, Nov. 2010, 13 pages.
Row,"Applying Semantic Social Graphs to Disambiguate Identity References", In Proceedings of the 6th European Semantic Web Conference on the Semantic Web: Research and Applications, May 31, 2009, 15 pages.
Simmons,"Keywords Are Dead! Long Live User Intent!", Retrieved at: http://searchenginewatch.com/sew/how-to/2234448/keywords-are-dead-long-live-user-intent, Jan. 8, 2013, 3 pages.
Singh,"Google Auto Suggest Now Saves You Lot of Clicks", retrieved from <http://www.technotraits.com/2009/05/google-auto-suggest-now-saves-you-lot-of-clicks/> on Jul. 7, 2009, May 20, 2009, 5 pages.
Slawski,"Predictive Search Query Suggestions", Retrieved from: <http://www.seobythesea.com/?p=1375> on Aug. 23, 2010, May 8, 2009, 14 pages.
Sproch,"Resolving Student Entities in the Facebook Social Graph", Retrieved at: snap.stanford.edu/class/cs341-2012/.../08-Sproch_CS341FinalPaper.pdf, Apr. 26, 2013, 7 pages.
Tsai,"Improving Query Suggestion by Utilizing User Intent", IEEE International Conference on Information Reuse and Integration, Aug. 4, 2010, 6 pages.
Warmington,"Assign Shortcuts to the Direction Keys", retrieved from <http://www.knowyourmobile.com/samsung/samsungx820/samsungx820userguides/237/assign_shortcuts_to_the_direction_keys.html> on Jul. 7, 2009, Mar. 13, 2007, 2 pages.
Yang,"Query Intent Disambiguation of Keyword-Based Semantic Entity Search in Dataspaces", In Proceedings of the 28th European Conference on IR Research, Mar. 2013, 12 pages.
You,"SocialSearch: Enhancing Entity Search with Social Network Matching", In Proceedings of the 14th International Conference on Extending Database Technology, Mar. 21, 2011, 6 pages.
"Extended European Search Report", EP Application No. 14717618.4, dated Aug. 2, 2016, 9 pages.
"Extended European Search Report", EP Application No. 14720831.8, dated Aug. 2, 2016, 9 pages.
"Final Office Action", U.S. Appl. No. 13/917,260, dated Aug. 26, 2016, 38 pages.
"Non-Final Office Action", U.S. Appl. No. 13/911,844, dated Nov. 4, 2016, 23 pages.
"Non-Final Office Action", U.S. Appl. No. 13/911,844, dated Jun. 15, 2017, 27 pages.
"Non-Final Office Action", U.S. Appl. No. 13/917,260, dated May 17, 2017, 39 pages.
"Non-Final Office Action", U.S. Appl. No. 13/904,887, dated Mar. 8, 2017, 29 pages.
"Foreign Office Action", EP Application No. 13887470.6, dated Feb. 10, 2017, 5 pages.
"Office Action Issued in Chinese Patent Application No. 201380077587.X", dated Feb. 24, 2018, 18 Pages.
"Final Office Action", U.S. Appl. No. 13/917,260, dated Sep. 28, 2017, 33 pages.
"Final Office Action", U.S. Appl. No. 13/904,887, dated Aug. 14, 2017, 34 pages.
"Foreign Office Action", EP Application No. 14720831.8, dated Oct. 20, 2017, 5 pages.
"Foreign Office Action", EP Application No. 14717618.4, dated Oct. 20, 2017, 8 pages.

(56) References Cited

OTHER PUBLICATIONS

"Second Office Action Issued in Chinese Patent Application No. 201380077587.X", dated Oct. 31, 2018, 6 Pages.

\* cited by examiner

FREQUENT SITES BASED ON BROWSING PATTERNS

RELATED APPLICATIONS

This application is a continuation of and claims priority under 35 U.S.C. § 120 to U.S. patent application Ser. No. 13/923,267, filed Jun. 20, 2013, entitled "Frequent Sites Based on Browsing Patterns," the disclosure of which is incorporated by reference herein in its entirety.

BACKGROUND

Some web browsers may present a user with a list of websites that have been previously browsed to by the user to enable future browsing. The websites presented to the user, however, may not be representative of the websites that are most relevant to the user based on the user's browsing patterns.

SUMMARY

Various embodiments provide a frequent sites module which is designed to generate frequent sites for a user that include websites that are relevant to the user based on browsing patterns of the user. In one or more embodiments, the frequent sites are generated from user-engagement data that indicates engagement by the user with websites identified in the user's browsing history. A web platform, e.g., a web browser, can display the frequent sites for the user in a frequent sites user interface container to enable the user to efficiently navigate to the websites that are relevant to the user by selection of websites from the frequent sites user interface container.

Various embodiments describe other aspects of frequent sites based on browsing patterns, including multiple-device frequent sites, device-specific frequent sites, domain-specific frequent sites, URL-specific frequent sites, decaying of frequent sites, recent frequent sites, and contextual frequent sites.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The same numbers are used throughout the drawings to reference like features and components.

DETAILED DESCRIPTION

Overview

Frequent sites may be used by a web platform to display a representation of websites that are frequently navigated to by a user. Conventional approaches utilized to display frequent sites may not be representative of the amount of time, or the user's interaction, with the websites in the frequent sites. Other problems of previous solutions to frequent sites include failing to take device-specific browsing patterns of a user into account, selecting a wrong subdomain of a frequented domain, and failing to take recent changes in a user's browsing patterns into account, to name just a few.

Embodiments are described herein, however, that provide a user with frequent sites that include websites that are relevant to the user based on browsing patterns of the user. For example, the frequent sites can be generated from user-engagement data that indicates engagement by the user with websites identified in the user's browsing history and/or engagement by the user with a web platform, such as a web browser.

Various embodiments describe other aspects of frequent sites based on browsing patterns, including multiple-device frequent sites, device-specific frequent sites, domain-specific frequent sites, URL-specific frequent sites, decaying of frequent sites, recent frequent sites, and contextual frequent sites.

A web platform, e.g., a web browser, can display the frequent sites for the user in a frequent sites user interface container to enable the user to efficiently navigate to the websites that are relevant to the user by selection of websites from the frequent sites user interface container. A web platform is a platform that works in connection with content of the web, e.g. public content. A web platform can include and make use of many different types of technologies such as, by way of example and not limitation, URLs, HTTP, REST, HTML, CSS, JavaScript, DOM, as well as other technologies. The web platform can also work with a variety of data formats such as XML, JSON, and the like. Web platforms can include web browsers, local applications such as Windows® Store applications that can be executed on a user's local computing device, and the like.

Further discussion of these embodiments and others may be found in the following sections.

Example Environment

Figure 1:
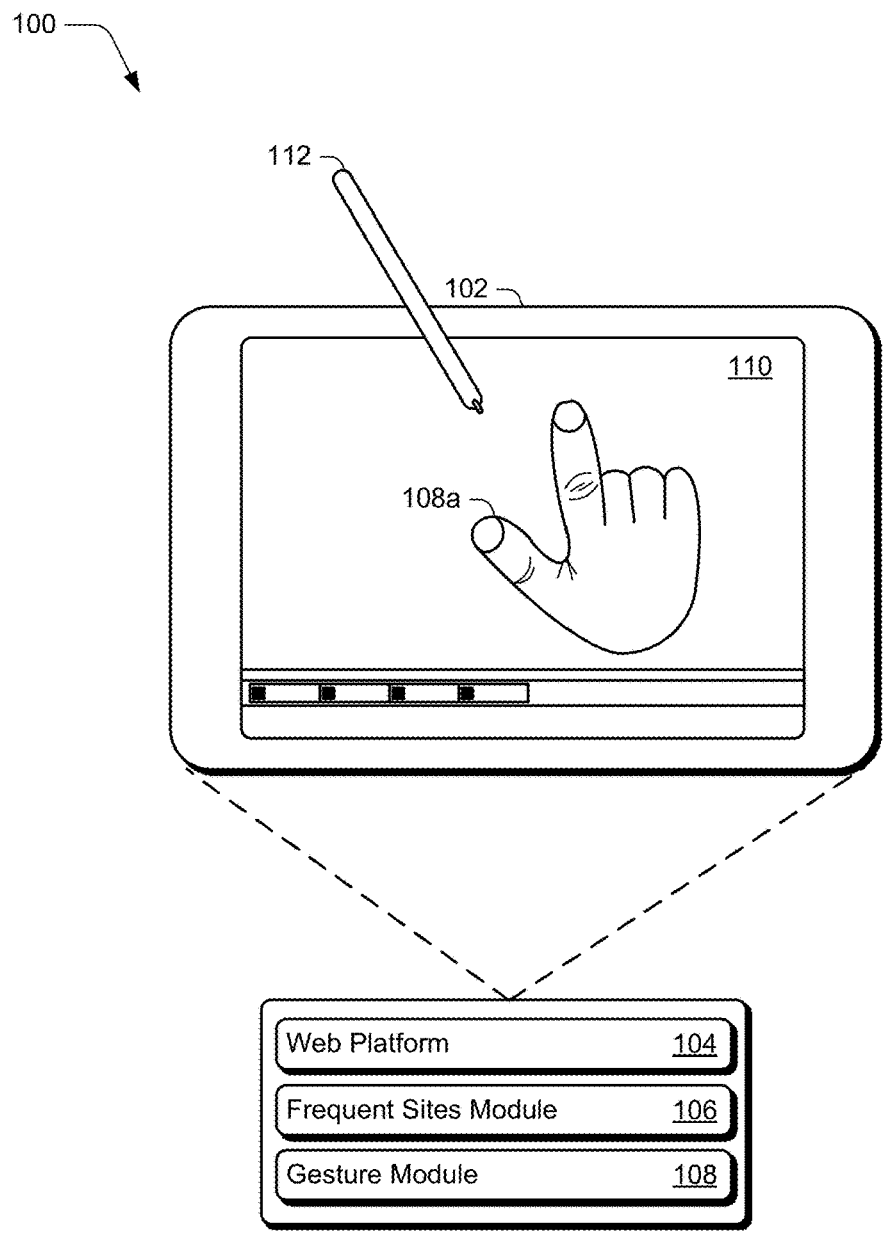
FIG. 1 is an illustration of an environment in an example implementation in accordance with one or more embodiments.

FIG. 1 is an illustration of an environment 100 in an example implementation that is operable to employ the techniques described in this document. The illustrated environment 100 includes an example of a computing device 102 that may be configured in a variety of ways. For example, computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, computing device 102 may range from full resource devices with substantial memory and processor resources (e.g., personal computers, game consoles) to a low-resource device with limited memory and/or processing resources (e.g., traditional set-top boxes, hand-held game consoles). Computing device 102 also includes software that causes computing device 102 to perform one or more operations as described below.

Computing device 102 also includes a web platform 104. As noted above, the web platform works in connection with content of the web, e.g. public content such as web pages and the like. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platforms can include web browsers, local applications such as a Windows® Store application, and the like. In the examples described below, a web platform in the form of a web browser that navigates to various websites is utilized. It is to be appreciated and understood, however, that the inventive principles can be employed by web platforms other than web browsers.

Computing device 102 may also include a frequent sites module 106. Frequent sites module 106 is configured to generate frequent sites for a user that includes websites that are relevant to the user based on browsing patterns of the user. In some cases, frequent sites module 106 generates the frequent sites based on user-engagement data that indicates engagement by the user with websites identified in the user's browsing history. As described in more detail below, frequent sites module 106 may also be implemented to generate multiple-device frequent sites, device-specific frequent sites, domain-specific frequent sites, URL-specific frequent sites, recent frequent sites, and contextual frequent sites, and to decay frequent sites. While frequent sites module 106 is illustrated as residing at computing device 102, it is to be appreciated that frequent sites module may also be implemented, in whole or in part, at a platform 210, which is described below with regards to FIG. 2. Frequent sites module 106 will be described in more detail below.

Computing device 102 also includes a gesture module 108 that recognizes input pointer gestures that can be performed by one or more fingers, and causes operations or actions to be performed that correspond to the gestures. The gestures may be recognized by module 108 in a variety of different ways. For example, gesture module 108 may be configured to recognize a touch input, such as a finger of a user's hand 108a as proximal to display device 110 of computing device 102 using touchscreen functionality, or functionality that senses proximity of a user's finger that may not necessarily be physically touching the display device 110, e.g., using near field technology. Module 108 can be utilized to recognize single-finger gestures and bezel gestures, multiple-finger/same-hand gestures and bezel gestures, and/or multiple-finger/different-hand gestures and bezel gestures.

Computing device 102 may also be configured to detect and differentiate between a touch input (e.g., provided by one or more fingers of the user's hand 108a) and a stylus input (e.g., provided by a stylus 112). The differentiation may be performed in a variety of ways, such as by detecting an amount of the display device 110 that is contacted by the finger of the user's hand 108a versus an amount of the display device 110 that is contacted by stylus 112.

Thus, gesture module 108 may support a variety of different gesture techniques through recognition and leverage of a division between stylus and touch inputs, as well as different types of touch inputs and non-touch inputs.

Figure 2:
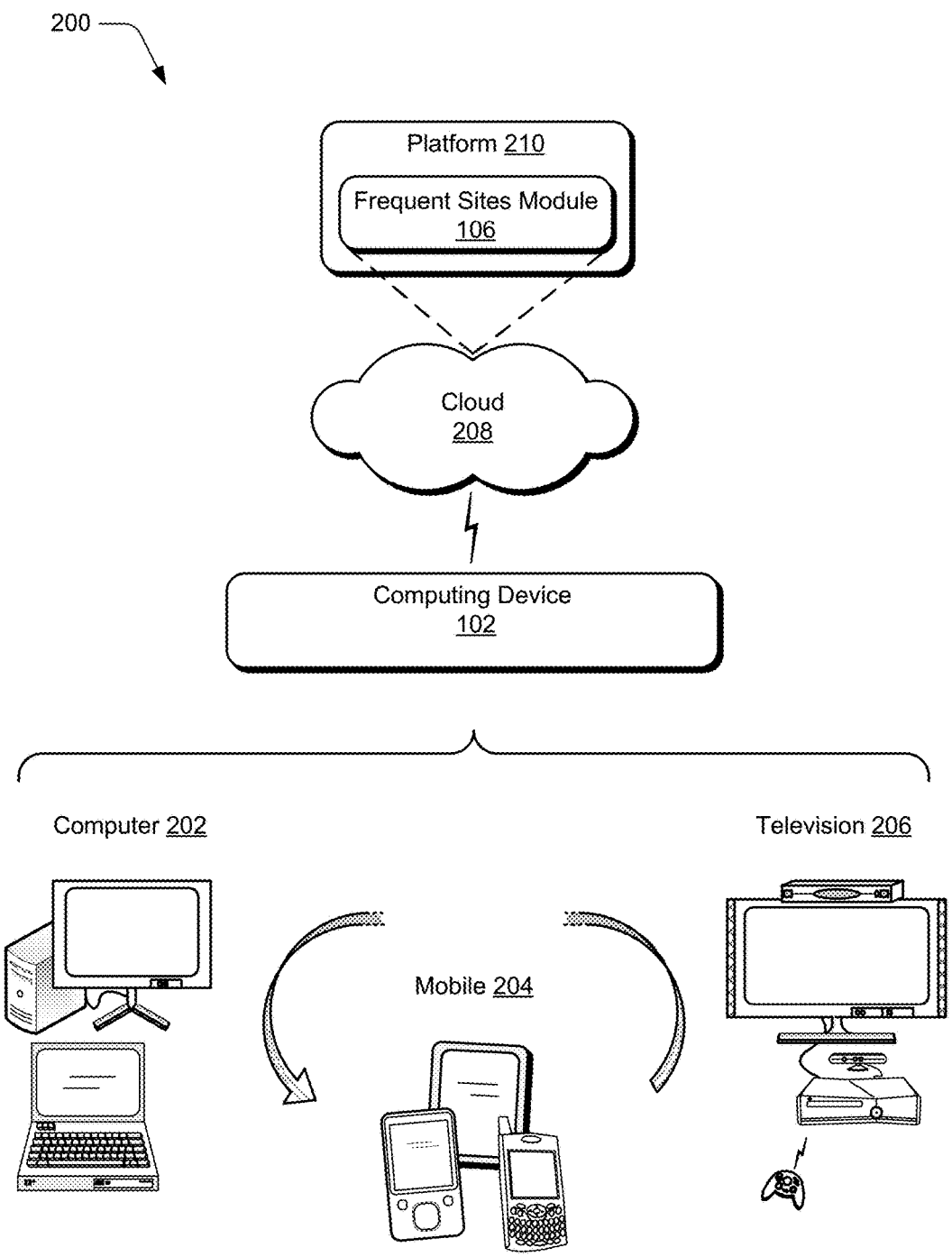
FIG. 2 is an illustration of a system in an example implementation showing FIG. 1 in greater detail.

FIG. 2 illustrates an example system 200 that includes computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers. These computers can be connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, computing device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, computing device 102 may be implemented as the computer 202 class of a device that includes a personal computer, desktop computer, a multi-screen computer, laptop computer, netbook, and so on. Each of these different configurations may employ a web platform, e.g., a web browser, as described above and below.

Computing device 102 may also be implemented as the mobile 204 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

Cloud 208 includes and/or is representative of a platform 210 that can include frequent sites module 106. Platform 210 abstracts underlying functionality of hardware (e.g., servers) and software resources of cloud 208. Frequent sites module 106 may include applications and/or data that can be utilized while computer processing is executed on servers that are remote from the computing device 102. Frequent sites module 106 can be provided as a service over the Internet and/or through a subscriber network, such as a cellular or Wi-Fi network.

Frequent sites module 106 is configured to generate frequent sites for a user that includes websites that are relevant to the user based on browsing patterns of the user. In some cases, frequent sites module 106 generates the frequent sites based on user-engagement data that indicates engagement by the user with websites identified in the user's browsing history. As described in more detail below, frequent sites module 106 may also be implemented to generate multiple-device frequent sites, device-specific frequent sites, domain-specific frequent sites, URL-specific frequent sites, recent frequent sites, and contextual frequent sites, and to decay frequent sites. While frequent sites module 106 is illustrated in FIG. 2 as residing at platform 210, it is to be appreciated that frequent sites module may also be implemented, in whole or in part, at computing device 102 as described above. Frequent sites module 106 will be described in more detail below.

Platform 210 may abstract resources and functions to connect computing device 102 with other computing devices. Platform 210 may also serve to abstract scaling of resources to provide a corresponding level of scale to encountered demand for frequent sites module 106 that are implemented via platform 210. Accordingly, in an interconnected device embodiment, implementation of functionality described herein may be distributed throughout system 200. For example, the functionality may be implemented in part on computing device 102 as well as via platform 210 that abstracts the functionality of cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Having described example operating environments in which the inventive principles can be employed, consider now a discussion of various embodiments.

Frequent Sites Based on User-Engagement Data

In one or more embodiments, frequent sites module 106 is configured to generate frequent sites for a user that includes websites that are relevant to the user based on browsing patterns of the user. As described herein, the term "website" is used to refer to websites or web pages that can be navigated to via a web platform using a web address of the website. Examples of web addresses include uniform resource locators (URLs), uniform resource identifiers (URIs), internationalized resource identifiers (IRIs), and internationalized domain names (IDNs).

Web platform 104 is configured to monitor a user's browsing history as the user navigates to various websites. Frequent sites module 106 receives the user's browsing history from web platform 104, and uses the browsing history to generate the frequent sites. In some cases frequent sites module 106 can be executed locally at a computing device. For example, both web platform 104 and frequent sites module 106 can be implemented locally at computing device 102. Alternately, at least part of frequent sites module 106 can be implemented remote from computing device 102, such as at one or more server computers.

In one or more embodiments, a user's browsing history includes user-engagement data for each website identified in the browsing history. The user-engagement data may include user interactions with each website identified in the browsing history, such as clicking on links on websites, typing into data entry fields on websites, scrolling on websites, watching videos on websites, listening to audio on the websites, and the like. In some cases, frequent sites module 106 measures the specific user interaction with a website, such as the number of clicks on the website or the number of letters typed into text boxes on the website. Different values may be assigned to different interaction items. For example, typing into a data entry field of a website may be assigned a higher user interaction value than scrolling the website.

The user-engagement data may also include a time value indicating an amount of time that the user was engaged with the website. For example, the time value may correspond to an amount of time that a user watched a video on a website, or an amount of time that the user read an article on the website which may be identified by the user scrolling a page of the website. In some cases, the time value may correspond to the amount of time the website is displayed as an "active" tab within a web browser.

Frequent sites module 106 can be configured to generate and order the frequent sites based on the user-engagement data. For example, frequent sites module 106 may arrange websites with higher user-engagement data values ahead of websites with lower user-engagement data values. The user-engagement data values may be a weighted aggregate of the user-engagement with a website for multiple navigations by the user to the website.

In one or more embodiments, frequent sites module 106 calculates a navigation value for each navigation to a website by a user, and a navigation count is calculated as the sum of the navigation values of each navigation to the website. The frequent sites are then determined and ordered based on the navigation count corresponding to each website. For example, websites with higher navigation counts are ordered ahead of websites with lower navigation counts in the frequent sites.

In some cases, the navigation count for a website is incremented by one for each navigation to a website by a user. Thus, a user that has navigated to the website Facebook.com six times, and to the website Mashable.com three times, may see Facebook.com arranged ahead of Mashable.com in the user's frequent sites.

In one or more embodiments, however, frequent sites module 106 calculates a navigation value for each instance of navigation to a website based on user-engagement with the website during the navigation. The navigation value may be normalized between 1 and 0, such that if the user has a high level of engagement with a website during a navigation, the navigation value is closer to 1. Conversely, if the user has a low level of engagement with the website during the navigation, the navigation value is closer to 0. Frequent sites module 106 then generates the frequent sites using the navigation count for each website.

As an example, consider the following. Sarah habitually navigates to Facebook.com and bounces off within a couple of seconds several times every day, but visits Mashble.com and reads articles for several hours every day. In previous approaches, Sarah's frequent sites may position Facebook.com ahead of Mashable.com because Sarah navigated to Facebook.com more frequently, and thus Facebook.com would have a higher navigation count. However, this may not be representative of the amount of time, or the level of engagement, that Sarah has with each website.

Now, frequent sites module 106 generates the frequent sites based on user-engagement with each website. Continuing with the example above, frequent sites module 106 now calculates a high navigation count for Mashable.com based on Sarah's engagement with Mashable.com. For example, Sarah may interact with Mashable.com by scrolling articles on Mashable.com and clicking links to different articles, which causes frequent sites module 106 to calculate a high navigation value each time Sarah navigates to Mashable.com. Conversely, frequent sites module 106 now calculates a low navigation count for Facebook.com based on Sarah's engagement with Facebook.com. For example, while Sarah frequently visits Facebook.com, the low amount of time Sarah spends during each visit causes frequent sites module 106 to calculate a low navigation value each time Sarah navigates to Facebook.com. Thus, by accounting for Sarah's engagement with Mashable.com and Facebook.com, frequent sites module 106 may now arrange Mashable.com ahead of Facebook.com in Sarah's frequent sites.

In one or more embodiments, frequent sites module 106 is configured to generate the frequent sites based on both user-engagement data with each website, as well as average user-engagement data. The average user-engagement data can include the average level of user interaction with a website, as well as an average time value corresponding to an amount of time of the average user interaction during a typical navigation. The average engagement data may be aggregated over a period of time, and may be updated each time that a user navigates to a website. Frequent sites module 106 may normalize the user-engagement data for a specific navigation, with the average user-engagement data, to generate a navigation value for the specific navigation.

In one or more embodiments, frequent sites module 106 is configured to determine whether a navigation to a website corresponds to a page bounce. As described herein, a page bounce occurs when a user navigates to a website and then navigates away to another website in a short period of time (e.g., less than 5 seconds). A page bounce may also be defined to include script or markup induced navigations by a website. In some cases a navigation value is not assigned for a navigation to a website if the navigation to the website is determined to correspond to a page bounce. Alternately, frequent sites module 106 may assign a low navigation value if the navigation is determined to correspond to a page bounce.

Web platform 104 is configured to render the frequent sites in a frequent sites user interface container by displaying a representation of websites (e.g., icon, tile, and so on) that are frequently navigated to by the user. As an example, consider FIG. 3. There, a web browser user interface is shown generally at 300 in accordance with one or more embodiments. In this particular example, web browser user interface 300 includes a frequent sites user interface container 302 that is displayed on a new tab page 304 of web browser user interface 300. Frequent sites user interface container 302 displays multiple tiles 306-324 that each correspond to a website in the frequent sites. In this particular example, frequent sites user interface container 302 display ten different websites. It is to be appreciated, however, that any number of websites can be displayed in frequent sites user interface container 302.

Figure 3:
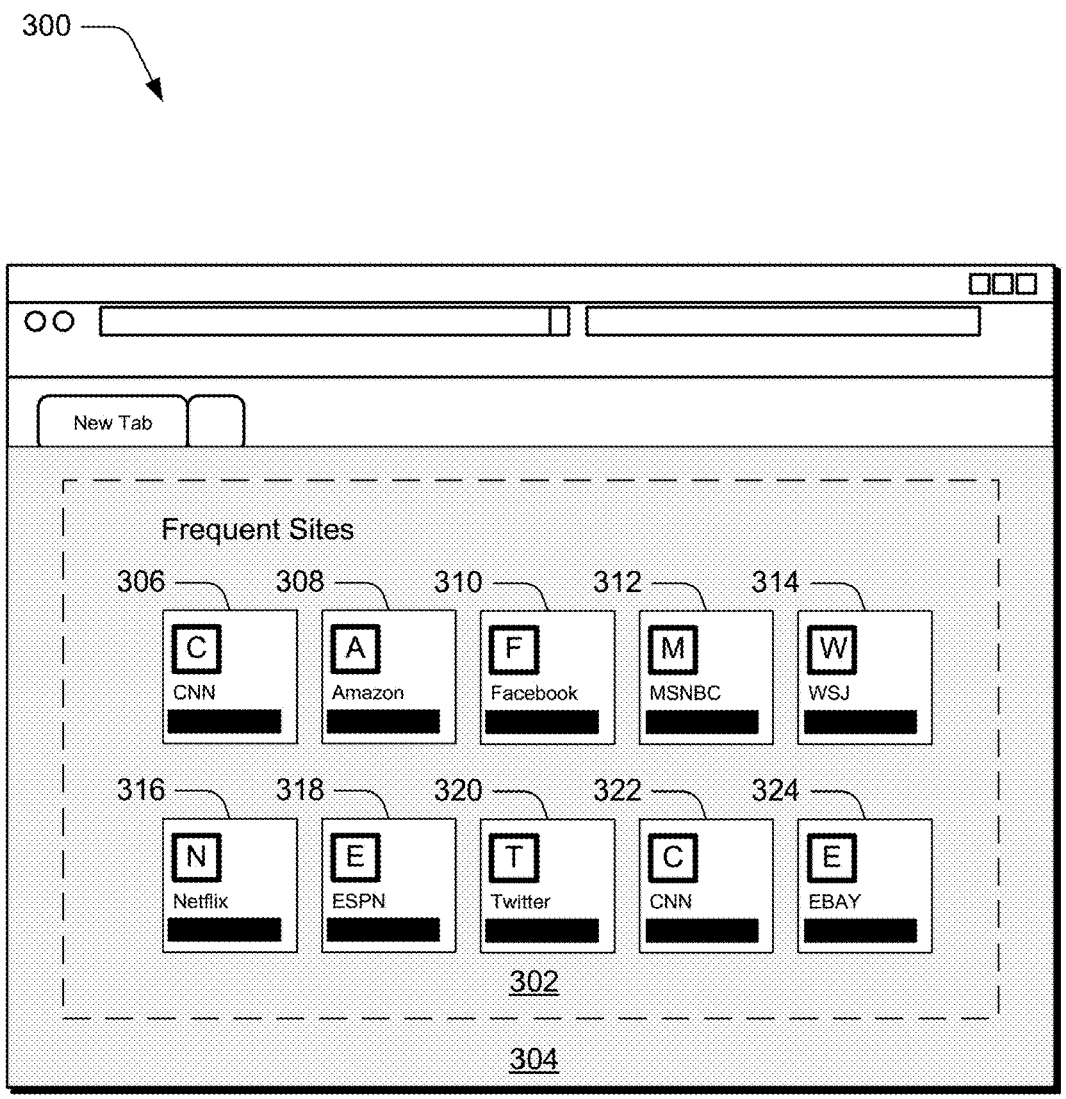
FIG. 3 illustrates an example user interface in accordance with one or more embodiments.

Tiles 306-324 are arranged based on the navigation count of each website corresponding to each tile. In FIG. 3, for example, the arrangement of tile 306 ahead of tile 308 in frequent sites user interface container 302 indicates that the website CNN.com has a higher navigation count than the website Amazon.com, and so on. As described throughout, the navigation count may be calculated using user-engagement data. By clicking on one of tiles 306-324, the browser can be navigated to the corresponding website. Thus, frequent sites user interface container 302 greatly facilitates and enhances a user's experience navigating to websites that are relevant to the user.

Figure 4:
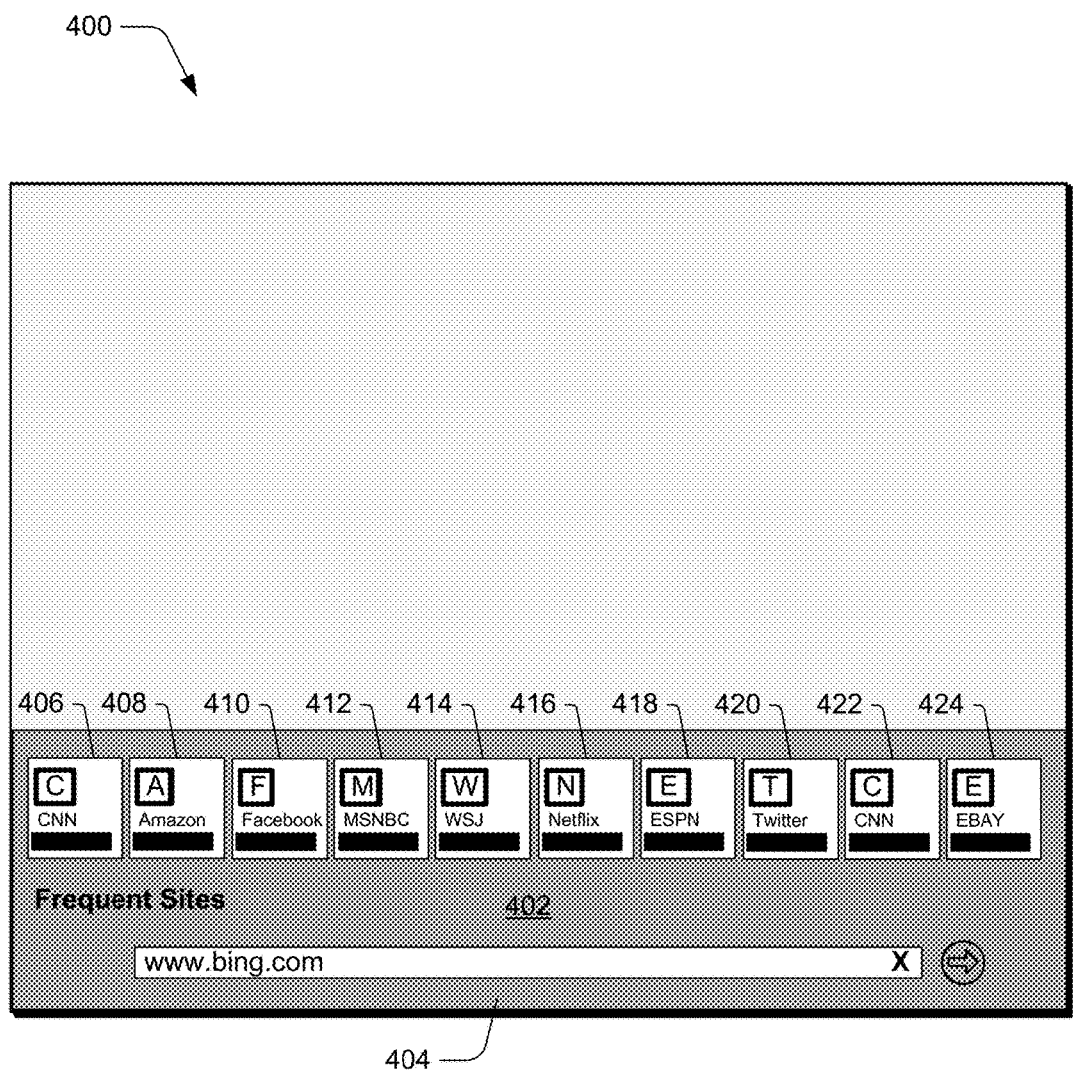
FIG. 4 illustrates an additional example user interface in accordance with one or more embodiments.

FIG. 4 illustrates an alternate web browser user interface that is shown generally at 400 in accordance with one or more embodiments. In this particular example, web browser user interface 400 includes a frequent sites user interface container 402 that is displayed in a quick site access container 404 of web browser user interface 400. Quick site access container 404 can be displayed when a user interacts with an address bar of the web browser. Similar to the frequent sites user interface container 302 of FIG. 3, frequent sites user interface container 402 displays multiple tiles 406-424 that correspond to websites that the user frequently visits. Frequent sites user interface containers 302 and 402 are illustrated to show example displays of frequent sites. It is to be appreciated, however, that the frequent sites may be displayed by web platform 104 in any suitable manner.

Multiple-Device Frequent Sites

In one or more embodiments, frequent sites module 106 enables a user's browsing history to roam across multiple devices. For example, a user may own, or use, multiple different computing devices, such as a desktop computer the user uses at work, a laptop computer, a tablet computer, and a mobile phone. The user may use each of these devices to navigate to different websites via web platform 104 executed on each device. Frequent sites module 106 can be configured to receive the user's browsing history from each device, and aggregate the user's browsing history for all of the user's devices to generate multiple-device frequent sites for the user.

In some cases, frequent sites module 106 can display the multiple-device frequent sites on a new device of the user. For example, if the user buys a new laptop, frequent sites module 106 can display the multiple frequent sites the first time that the user users web platform 104 on the new laptop.

Figure 5:
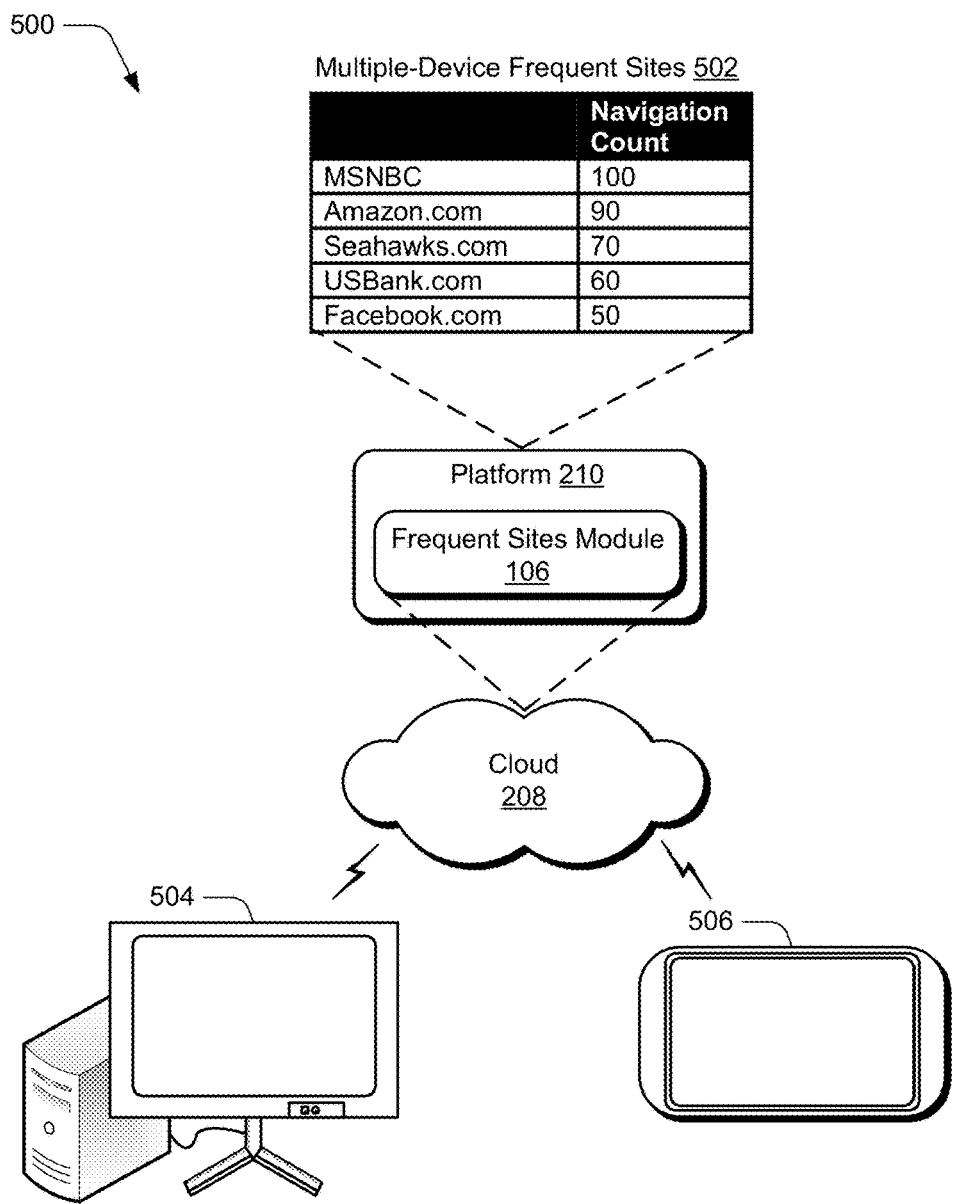
FIG. 5 illustrates an example of multiple-device frequent sites in accordance with one or more embodiments.

As an example, consider FIG. 5 which illustrates an example 500 of multiple-device frequent sites 502. As illustrated in FIG. 5, multiple-device frequent sites 502 are generated using browsing history data from a desktop computer 504 and a tablet computer 506. FIG. 5 illustrates multiple-device frequent sites as being generated by frequent sites module 106 at platform 210. Alternately, however, frequent sites module 106 can be implemented at each of device 504 and device 506. Frequent sites module 106, at each of devices 504 and 506, can receive a roamed browsing history from platform 210, and generate the multiple-device frequent sites at each of devices 504 and 506, based on the roamed browsing history.

In this example, consider that a user, Matt, owns both desktop computer 504 and tablet computer 506, and uses these devices to navigate to various websites via web platform 104 installed on each device. Web platform 104, installed on Matt's desktop computer, maintains a local browsing history 508 that indicates that Amazon.com, USBank.com, and Seahawks.com have navigation counts of 90, 60, and 30, respectively. Similarly, web platform 104, installed on Matt's tablet computer, maintains a local browsing history 510 that indicates that MSNBC.com, Facebook.com, and Seahawks.com have navigation counts of 100, 50, and 40, respectively. As described above, the navigation count may be generated from user-engagement data that identifies engagement by Matt with each website identified in Matt's browsing history.

Web platform 104, implemented at Matt's desktop computer and Matt's tablet computer, are each configured to send these local browsing histories to frequent sites module 106, which may be located remote from each of these devices. In this example, frequent sites module 106 is implemented at platform 210. Frequent sites module 106 receives the local browsing history from each of Matt's devices, and aggregates local browsing history 508 from Matt's desktop computer with local browsing history 510 from Matt's tablet computer to generate Matt's multiple-device frequent sites 502. In this example, frequent sites module 106 lists MSNBC.com first on multiple-device frequent sites 502 because MSNBC.com has the highest navigation count of any of the websites identified in Matt's browsing history.

Frequent sites module 106 lists Amazon.com second on multiple-device frequent sites 502 because Amazon.com has the second highest navigation count. Note, therefore, that Matt's multiple-device frequent sites reflect navigation by Matt via both Matt's desktop computer (Amazon.com) and Matt's tablet computer (MSNBC.com).

Next on multiple-device frequent sites 502 is Seahawks.com. Frequent sites module 106 lists Seahawks.com third on multiple-device frequent sites 502 by combining the navigation count of Seahawks.com on Matt's desktop computer with the navigation count to Seahawks.com on Matt's tablet computer. Thus, the navigation count for Seahawks.com, via both devices, is 70. The combined navigation count to Seahawks.com places Seahawks.com ahead of both USBank.com and Facebook.com, which have navigation counts of 60 and 50, respectively.

Device-Specific Frequent Sites

While multiple-device frequent sites may be beneficial to the user for a variety of different reasons, some users may establish device-specific browsing patterns and want their frequent sites to be customized for each of their devices.

In one or more embodiments, web platform 104 is configured to modify multiple-device frequent sites for a computing device based at least in part on a local browsing history at the computing device. As the user navigates to various websites on a computing device, web platform 104 can store a local browsing history at the computing device. Web platform 104 can also send the local browsing history to frequent sites module 106 to aggregate with the user's browsing history from one or more additional devices to generate the multiple-device frequent sites. Subsequently, web platform 104 can modify the multiple-device frequent sites using the local browsing history to generate device-specific frequent sites at the computing device. Generally, the device-specific frequent sites lists websites that have been navigated to on the local computing device ahead of websites that have not been navigated to on the local computing device. The device-specific frequent sites may include at least one website that is not included in the multiple-device frequent sites.

In some cases, to modify the multiple-device frequent sites, a weight is applied to websites that have been navigated to on the computing device to cause the websites that have been navigated to on the computing device to be listed higher in the device-specific frequent sites than websites that have not been navigated to on the local computing device.

In one or more embodiments, websites with a local navigation count at a computing device above a certain threshold are listed ahead of websites that have not been navigated to using the computing device in the device-specific frequent sites. For example, if the local browsing history indicates that five different websites have a local navigation count above a certain threshold, then these five websites will be listed ahead of any websites that have not been navigated to via the computing device in the device-specific frequent sites. The threshold, for example, may be one or more navigations to a website via the local computing device. Alternately, the threshold may be a specific local navigation count that is based on user-engagement data. In some cases, the websites that have been navigated to locally may be arranged based on the local navigation count. Any remaining spots in the device-specific frequent sites may then be filled in with websites from the multiple-device frequent sites that were navigated to by the user via different devices.

Returning to example 500, note that Matt has shown a preference to use his tablet computer to browse the web for news, such as at MSNBC.com, and to stay in touch with social network sites such as at Facebook.com. However, Matt rarely uses his tablet computer to visit shopping sites such as Amazon.com. Therefore, Matt may prefer to not have Amazon.com be placed in his frequent sites when Matt is using his tablet computer. Conversely, Matt has shown a preference to use his desktop computer to shop online for products, such as at Amazon.com, and to manage finances, such as at USBank.com. Matt rarely uses his desktop computer to visit social network sites, however, such as Facebook.com. Therefore, Matt may prefer to not have Facebook.com be placed in his frequent sites when Matt is using his desktop computer.

Figure 6:
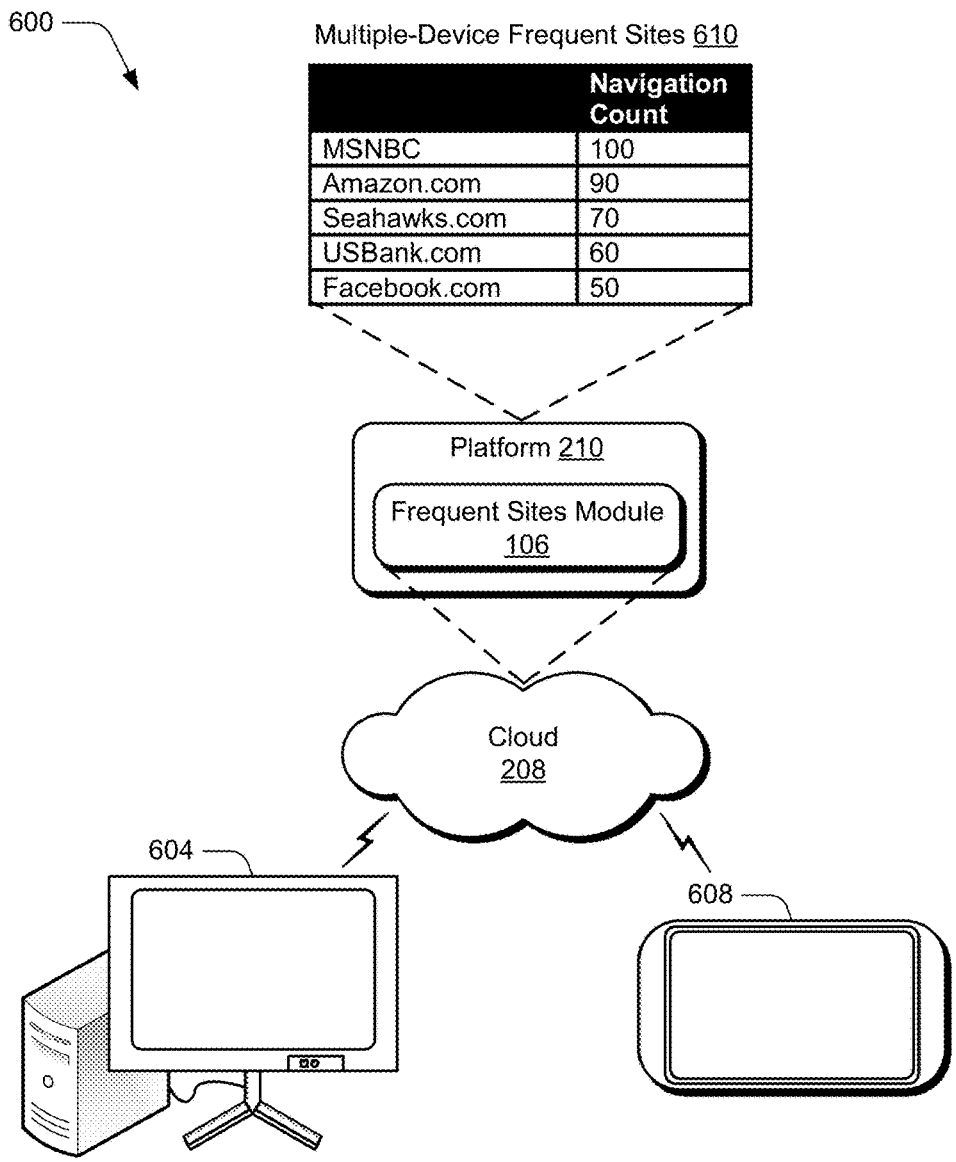
FIG. 6 illustrates an example of device-specific frequent sites in accordance with one or more embodiments.

FIG. 6 illustrates an example 600 of device-specific frequent sites 602 corresponding to a desktop computer 604, and device-specific frequent sites 606 corresponding to a tablet computer 608. Example 600 further includes multiple-device frequent sites 610. In this example, multiple-device frequent sites 610 correspond to multiple-device frequent sites 502, from FIG. 5. As described in FIG. 5, therefore, multiple-device frequent sites 610 were generated based on the local browsing histories of desktop computer 604 and tablet computer 608, which are illustrated in FIG. 5 as desktop computer 504 and tablet computer 506, respectively.

In this particular example, web platform 104 has modified multiple-device frequent sites 610 at desktop computer 604 based on the local browsing history at the desktop computer to generate device-specific frequent sites 602. Device-specific frequent sites 602 lists websites that have been navigated to on Matt's desktop computer ahead of websites that have not been navigated to at his desktop computer. In this example, Amazon.com has the highest navigation count of websites that have been navigated to at Matt's desktop computer, and thus is placed first in device-specific frequent sites 602.

Device-specific frequent sites 602 lists Seahawks.com next, followed by USBank.com, because while both Seahawks.com and USBank.com have been navigated to on Matt's desktop computer, Seahawks.com has a higher navigation count of 70.

In some embodiments, web platform 104 lists websites in the device-specific frequent sites that have not been navigated to on the local computing device if there are available spaces. In device-specific frequent sites 602, for example, MSNBC.com and Facebook.com are listed fourth and fifth, respectively, even though these websites have not been navigated to by Matt using his desktop computer because there are open spots in the device-specific frequent sites. In addition, note that MSNBC.com has the highest navigation count, but is listed fourth in device-specific frequent sites 602 because it has not been navigated to at desktop computer 604.

Similarly, web platform 104 has modified multiple-device frequent sites 610 at tablet computer 608 based on the local browsing history at the tablet computer to generate device-specific frequent sites 606. Device-specific frequent sites 606 lists websites that have been navigated to on Matt's tablet computer ahead of websites that have not been navigated to on his tablet computer. In this example, MSNBC.com has the highest navigation count of websites that have been navigated to at Matt's tablet computer, and thus is placed first in device-specific frequent sites 606.

Device-specific frequent sites 606 lists Seahawks.com next, followed by Facebook.com, because while both Seahawks.com and Facebook.com have been navigated to on Matt's desktop computer, Seahawks.com has a higher navigation count. Amazon.com and USBank.com are listed fourth and fifth, respectively, in device-specific frequent sites 606 even though these websites have not been navigated to by Matt using his tablet computer because there are open spots in device-specific frequent sites 606.

Domain-Specific and URL-Specific Frequent Sites

In one or more embodiments, the frequent sites are generated to contain a maximum of one website per domain. Websites can be grouped into top-level websites associated with a domain, and sub-level websites, or pages, within the domain. For example, ESPN.com is a top-level website associated with the URL ESPN.com as well as the domain ESPN. In contrast, ESPN.com/NFL is also associated with the domain ESPN, but is a sub-level website, or page, associated with the URL ESPN.com/NFL.

Frequent sites module 106 generates the frequent sites based on a domain-specific navigation count that is defined as the sum of the URL-specific navigation count for each URL within the domain. In other words, each domain receives a domain-specific navigation count that is the sum of the navigation count of each page within the domain. In this way, the domain receives a single navigation value that is used to qualify the domain for the frequent sites. The URL-specific navigation count can be determined based on user-engagement data, as described above.

In one or more embodiments, a URL within a domain that is qualified for the frequent sites is selected to represent the domain. In some cases, the URL with the highest URL-specific navigation count of all URLs within a domain is selected to represent the domain in the frequent sites.

Figure 7:
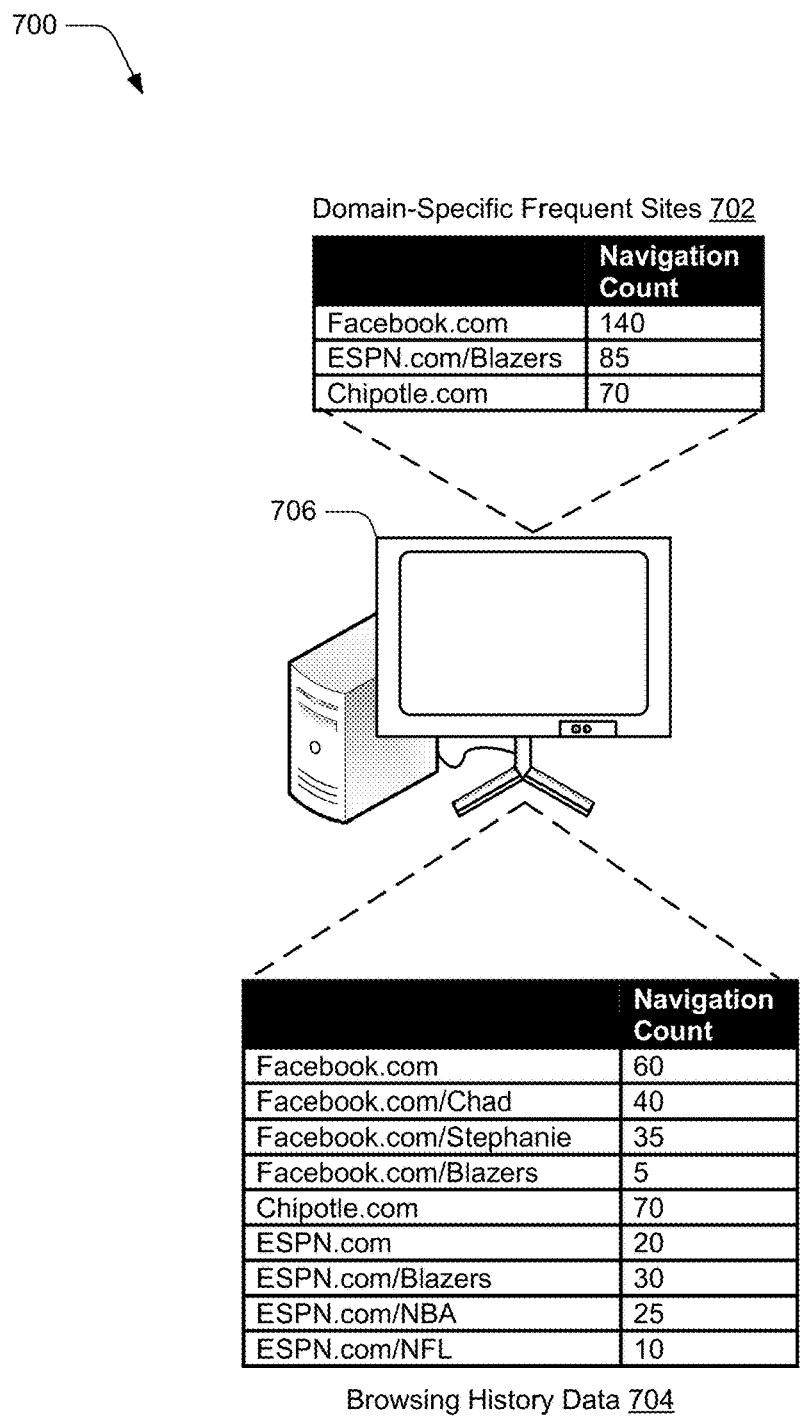
FIG. 7 illustrates an example of domain-specific frequent sites in accordance with one or more embodiments.

As an example, consider FIG. 7 which illustrates an example 700 of domain-specific frequent sites 702 that are generated based on browsing history data 704 from a desktop computer 706. In this example, consider that a user, Chad, owns desktop computer 706 and uses his desktop computer to navigate to Facebook.com which provides Chad with updates from his friends. Additionally, Chad spends a good amount of time on other pages within the Facebook domain, such as his personal page on Facebook that is associated with the URL Facebook.com/Chad, his girlfriend Stephanie's page on Facebook which is associated with the URL Facebook.com/Stephanie, and the official Facebook page of the Portland Trailblazer which is associated with the URL Facebook.com/Blazers.

Frequent sites module 106 maintains a URL-specific navigation count for each of the URLs within the Facebook domain. In this example, the URL-specific navigation counts for the URLs Facebook.com, Facebook.com/Chad, Facebook.com/Stephanie, and Facebook.com/Blazers, are 60, 40, 35, and 5, respectively. Frequent sites module 106 also maintains URL-specific navigation counts for Chipotle.com of 70, ESPN.com of 20, ESPN.com/Blazers of 30, ESPN.com/NBA of 25, and ESPN.com/NFL of 10. It is to be understood that frequent sites module 106 may generate these URL-specific navigation counts based on user-engagement data, as described throughout.

Previous solutions might list each URL separately in Chad's frequent sites. For example, conventional frequent sites might include the URLs Facebook.com, Facebook.com/Chad, Facebook.com/Stephanie, Facebook.com/Seahawks, Chiptole.com, ESPN.com, ESPN.com/Blazers, ESPN.com/NBA, and ESPN.com/NFL in Chad's frequent sites. This conventional approach causes Chad's frequent sites to be cluttered, and prevents other frequent sites from being displayed. Furthermore, Chad may usually navigate initially to Facebook.com, and then navigate further to additional pages within Facebook.com. Therefore, Chad does not need his frequent sites to include Facebook.com/Stephanie, for example, because he always navigates to Facebook.com, and then navigates from within the domain Facebook.com to the page Facebook.com/Stephanie.

Additionally, by listing each URL within a domain separately, previous solutions may not account for the actual level of engagement that the user has with a domain. For example, while Chad may spend a lot of time within the Facebook domain, Chad's URL-specific navigation count for the URL Facebook.com is not greater than the URL-specific navigation count for the URL Chipotle.com. Thus, previous solutions may generate Chad's frequent sites in the following order: Chipotle.com, Facebook.com, Facebook.com/Chad, Facebook.com/Stephanie, ESPN.com/Blazers, ESPN.com/NBA, ESPN.com, ESPN.com/NFL, and Facebook.com/Blazers.

Now, frequent sites module 106 generates the frequent sites based on the domain-specific navigation count. In this example, the domain-specific navigation count for the Facebook domain is 140, which is the sum of the URL-specific navigation counts for Facebook.com, Facebook.com/Chad, Facebook.com/Stephanie, and Facebook.com/Blazers. Similarly, the domain-specific navigation count for the domain ESPN is 85, which is the sum of the URL-specific navigation counts for ESPN.com, ESPN.com/Blazers, ESPN.com/NBA, and ESPN.com/NFL. The domain-specific navigation count for the Chipotle domain is 70, because the only URL within the Chipotle domain that Chad has navigated to is Chipotle.com.

Note, in this example, ESPN.com/Blazers is listed in domain-specific frequent sites 702 instead of ESPN.com. This is because frequent sites module 106 selects the URL with the highest URL-specific navigation count of all URLs within a domain to represent the domain in the frequent sites. Thus, in this example, the domain-specific navigation count of 85 places the domain ESPN second in domain-specific frequent sites 702, and the URL-specific navigation count of ESPN.com/Blazers places the URL ESPN.com/Blazers in domain-specific frequent sites 702 to represent the ESPN domain.

Decaying Frequent Sites

In one or more embodiments, frequent sites module 106 is configured to decay websites from the frequent sites based on a recent browsing history of a user. If the user has not navigated to a website listed in the frequent sites during a threshold browsing period, the navigation count of the website may be decayed. Decaying the navigation count of the website may cause the position of the website in the frequent sites to be modified or removed completely from the user's frequent sites. The threshold browsing period may be defined in terms of "browsing days". As described herein, a browsing day corresponds to a day in which the user navigates to one or more websites via web platform 104. By determining the threshold browsing period using browsing days, instead of just regular days, the user's frequent sites are not modified if the user does use web platform 104 for a period of time. For example, if the user goes on vacation for 7 days and does not use web platform 104 during that time, then the user's frequent sites may not be modified by frequent sites module 106.

In one or more embodiments, frequent sites module 106 is configured to decay a navigation count of a website to modify a position of the website in the frequent sites if the user does not navigate to the website via web platform 104 during a first threshold browsing period. The first threshold browsing period, for example, may correspond to 1 browsing day. Thus, this change can be quickly noticed by the user. For example, if a website is listed first in the frequent sites, and the user does not navigate to the website during a browsing day, frequent sites module 106 may modify the frequent sites so that the website is now listed second in the frequent sites. This provides the user with immediate feedback, and helps the user understand how the frequent sites are generated.

Previous approaches were slow to decay websites from the frequent sites. For example, in some cases if a user did not visit a website for over a week, the website might still be displayed in the user's frequent sites. Consider, for example, that a user, John, navigates to Yahoo.com to check e-mail twice per day. Last week, however, John switched his primary email account to Hotmail.com. Now, John still performs his regular habit of checking email twice per day, but navigates to Hotmail.com to check email instead of Yahoo.com. Because John switched email providers, Yahoo.com is no longer relevant to John. Previous solutions, however, would take a long time to move Yahoo.com out of John's frequent sites.

Now, frequent sites module 106 quickly decays Yahoo.com from John's frequent sites. For example, in some embodiments, a position of Yahoo.com in John's frequent sites will be modified if John does not browse to Yahoo.com during a single browsing day.

In one or more embodiments, frequent sites module 106 is configured to remove a website from the frequent sites if the user does not navigate to the website via web platform 104 during a second threshold browsing period. The second threshold browsing period may be greater than the first threshold browsing period. For example, the second threshold browsing period may be 7 browsing days, 14 browsing days, or 30 browsing days. Thus, continuing with the example above, if John does not browse to Yahoo.com within 7 browsing days, Yahoo.com may be removed completely from John's frequent sites.

In some embodiments, frequent sites module 106 is configured to implement device-specific decaying of frequent sites. Thus, if John has stopped browsing to Facebook.com on his desktop computer, but still navigates to Facebook.com on his tablet computer, frequent sites module 106 can begin to decay Yahoo.com from the frequent sites on John's desktop computer, but not from the frequent sites on John's tablet computer.

Recent Frequent Sites

In one or more embodiments, frequent sites module 106 is configured to generate the frequent sites based on a recency value that measures trends in the user's browsing history in the recent past. For example, the recent past may include the last three days of browsing. This is the converse approach to decaying websites from the frequent sites, and accounts for websites which have recently made their way into the user's browsing history. If frequent sites module 106 detects that a user has a level of engagement with a website that is above a threshold in a recent time period, the frequent sites module 106 may cause the website to be included in the user's frequents sites. For instance, weightage may be added to the website's navigation count to cause the website to be included in the frequent sites.

As an example, consider a user, Kim, who recently discovered the website Pinterest.com, and is immediately engaged with the website. Even though three days ago Kim had never visited Pinterest.com before, for the last three days Kim is repeatedly navigating back to Pinterest.com to check for new content every few hours. In this scenario, frequent sites module 106 can modify the position of Pinterest.com in Kim's frequent sites by applying weightage to Pinterest.com to move Pinterest.com up Kim's frequent sites.

In some cases, frequent sites module 106 may include an indicator that can be displayed with the website in the frequent sites user interface container in web platform 104 that indicates that the website is a trending, or recently popular site. Alternately, frequent sites module 106 can include a separate section within the frequent sites user interface container that includes recent or trending sites. For example, web platform 104 can display two or three recent frequent sites, or trending frequent sites, in the frequent sites user interface container in a separate section from the frequent sites.

Contextual Frequent Sites

In one or more embodiments, frequent sites module 106 generates contextual frequent sites that include at least one additional website, that is not generally included in the frequent sites, based on a current context of a user. The current context of a user may be based on detected browsing patterns of the user that correspond to a time of day or a time of week. For example, frequent sites module 106 may detect that the user navigates to banking websites on the weekend, and navigates to social media sites after work hours. Frequent sites module 106 then generates the contextual frequent sites for the user based on the time of day or the time of week. Continuing with the example above, the frequent sites may be modified to include one or more banking websites on Saturday and Sunday, and may be modified to include one or more social media websites after 5 pm Monday through Friday.

Alternately or additionally, the current context of a user may be based on detected browsing patterns of the user that correspond to an established navigation pattern. To determine an established navigation pattern, frequent sites module 106 may identify companion websites that are frequently navigated to within a threshold period of time. For example, frequent sites module 106 may determine that Twitter.com, Facebook.com, and Instagram.com are companion websites if these websites are frequently navigated to within a 20-minute time period. Then, when a user navigates to a companion website, the frequent sites can be modified to include the other companion websites.

In some cases, frequent sites module 106 may include an indicator that can be displayed with the website in the frequent sites user interface container in web platform 104 that indicates that the website is a contextual frequent site. Alternately, frequent sites module 106 can include a separate section within the frequent sites user interface container that includes contextual frequent sites.

Example Methods

FIGS. 8-11 illustrate example flow diagrams that describe steps in methods in accordance with one or more embodiments. These methods can be implemented in connection with any suitable hardware, software, firmware, or combination thereof. In at least some embodiments, aspects of the methods are implemented by web platform 104 that can be implemented as, by way of example and not limitation, a web browser. Other aspects of the methods can be performed by a service provider, such as frequent sites module 106. It is to be appreciated, however, that either frequent sites module 106 or web platform 104 can be implemented to perform any of the steps in FIGS. 8-11. In some cases, frequent sites module 106 is implemented local to a computing device on which web platform 104 is implemented. Alternately, at least a portion of frequent sites module 106 may be implemented remote from the computing device on which web platform 104 is implemented, such as at one or more server computers.

Figure 8:
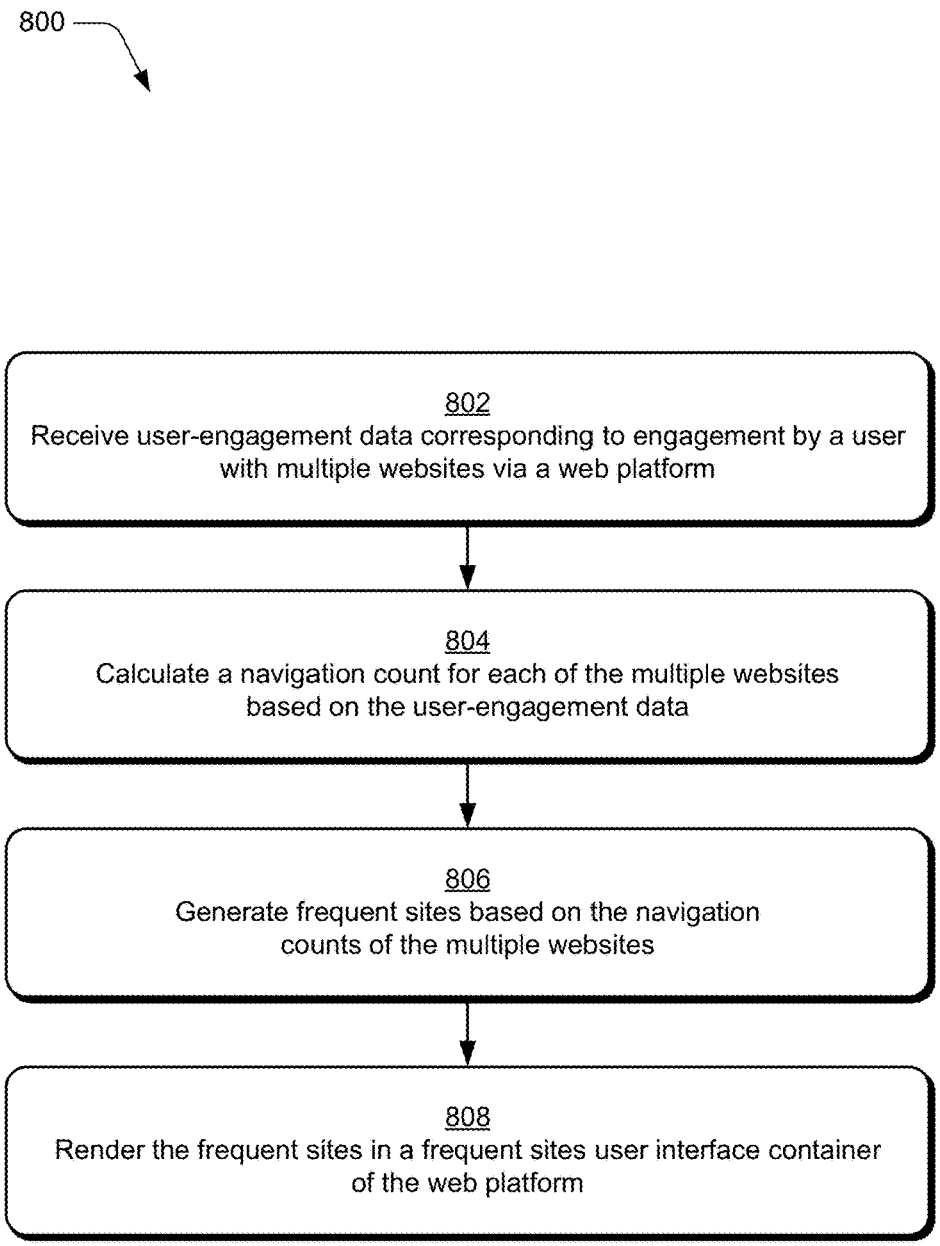
FIG. 8 is a flow diagram that describes steps in a method in accordance with one or more embodiments.

FIG. 8 illustrates a flow diagram depicting an example method 800 for generating frequent sites based on user-engagement data. Step 802 receives user-engagement data corresponding to engagement by a user with multiple websites via a web platform. For example, frequent sites module 106 receives user-engagement data corresponding to engagement by a user with multiple websites using web platform 104. The user-engagement data can include user interactions with the multiple websites, which can include clicking on links on the websites, typing data into data entry fields on the websites, scrolling the websites, watching videos on the websites, listening to audio on the websites, and the like. The user-engagement data may also include a time value indicating an amount of time of each of the user interactions with the websites.

Step 804 calculates a navigation count for each of the multiple websites based on the user-engagement data. In some cases, frequent sites module 106 calculates, for each navigation to a particular one of the multiple websites, a navigation value for the navigation based on user-engagement with the website during the navigation. In some cases, the navigation value may be normalized between 1 and 0, such that if the user has a high level of engagement with a website during a navigation, the navigation value is closer to 1. Conversely, if the user has a low level of engagement with the website during the navigation, the navigation value is closer to 0. The navigation count can then be calculated as a sum of the navigation values for each of the navigations to a particular website.

Step 806 generates frequent sites based on the navigation counts of the multiple websites. The frequent sites include a list of one or more of the multiple websites that is ordered based on the navigation counts of the multiple websites. In some cases, websites with higher navigation counts are ordered ahead of websites with lower navigation counts in the frequent sites.

Step 808 renders the frequent sites in a frequent sites user interface container of the web platform. The frequent sites can be rendered in the frequent sites user interface container of web platform 104 in any suitable way. For example, in some cases, the frequent sites are rendered in a frequent sites user interface container in a new tab page of a web browser user interface, as illustrated in FIG. 3. Alternately, the frequent sites can be rendered in a frequent sites user interface container in a quick access sites container of a web browser user interface, as illustrated in FIG. 4.

Figure 9:
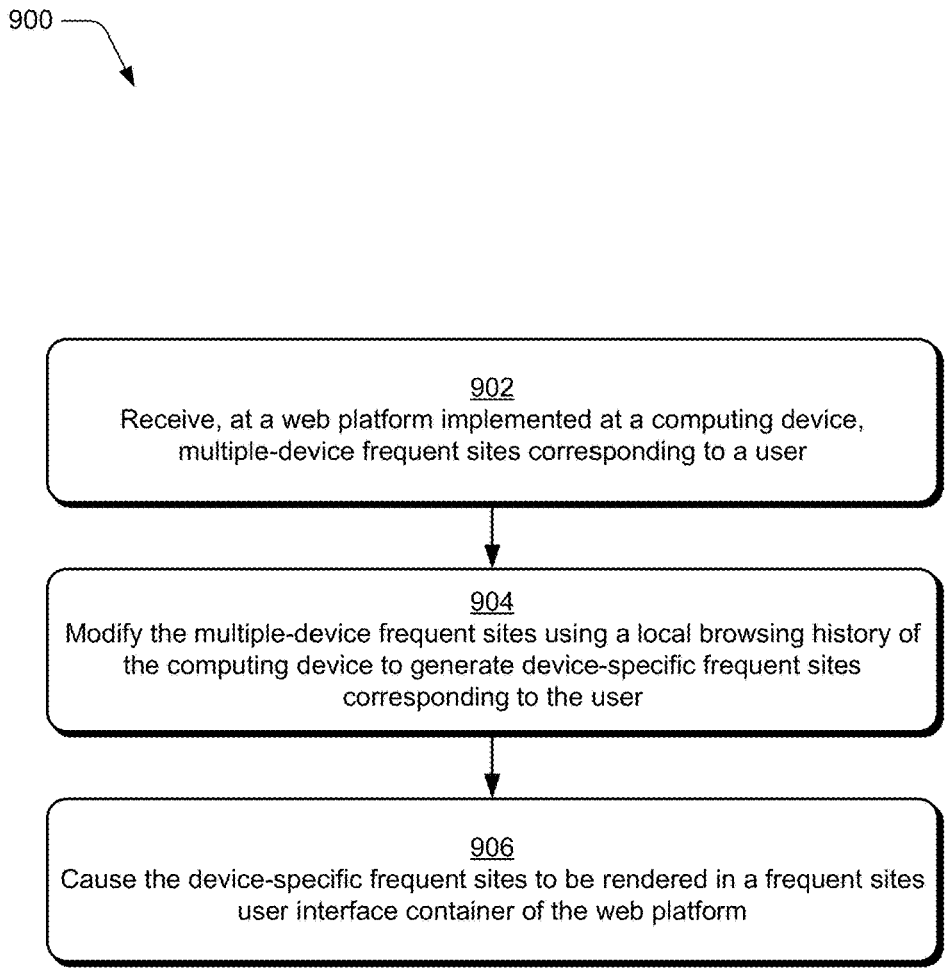
FIG. 9 is an additional flow diagram that describes steps in a method in accordance with one or more embodiments.

FIG. 9 illustrates a flow diagram depicting an example method 900 for generating device-specific frequent sites. Step 902 receives, at a web platform implemented at a computing device, multiple-device frequent sites corresponding to a user. For example, web platform 104 implemented at computing device 102, receives multiple-device frequent sites from frequent sites module 106. Frequent sites module 106 may be implemented remote from computing device 102, such as at one or more server computers. The multiple-device frequent sites may be generated for a user based on the user's browsing history using multiple computing devices. As described throughout, the browsing history of the user may include user-engagement data that indicates engagement by the user with websites identified in the user's browsing history.

Step 904 modifies the multiple-device frequent sites using a local browsing history of the computing device to generate device-specific frequent sites corresponding to the user. In some cases, to modify the multiple-device frequent sites, a weightage is applied to websites that have been navigated to on the computing device to cause the websites that have been navigated to on the computing device to be listed higher in the device-specific frequent sites than websites that have not been navigated to on the local computing device. In one or more embodiments, websites that have a local navigation count above a certain threshold are listed ahead of websites that have not been navigated to using the computing device in the device-specific frequent sites. Any remaining spots in the device-specific frequent sites may then be filled in with websites from the multiple-device frequent sites that were navigated to using different devices.

Step 906 causes the device-specific frequent sites to be rendered in a frequent sites user interface container of the web platform. The device-specific frequent sites can be rendered in the frequent sites user interface container of web platform 104 in any suitable way. For example, in some cases, the device-specific frequent sites are rendered in a frequent sites user interface container in a new tab page of a web browser user interface, as illustrated in FIG. 3. Alternately, the device-specific frequent sites can be rendered in a frequent sites user interface container in a quick access sites container of a web browser user interface, as illustrated in FIG. 4.

Figure 10:
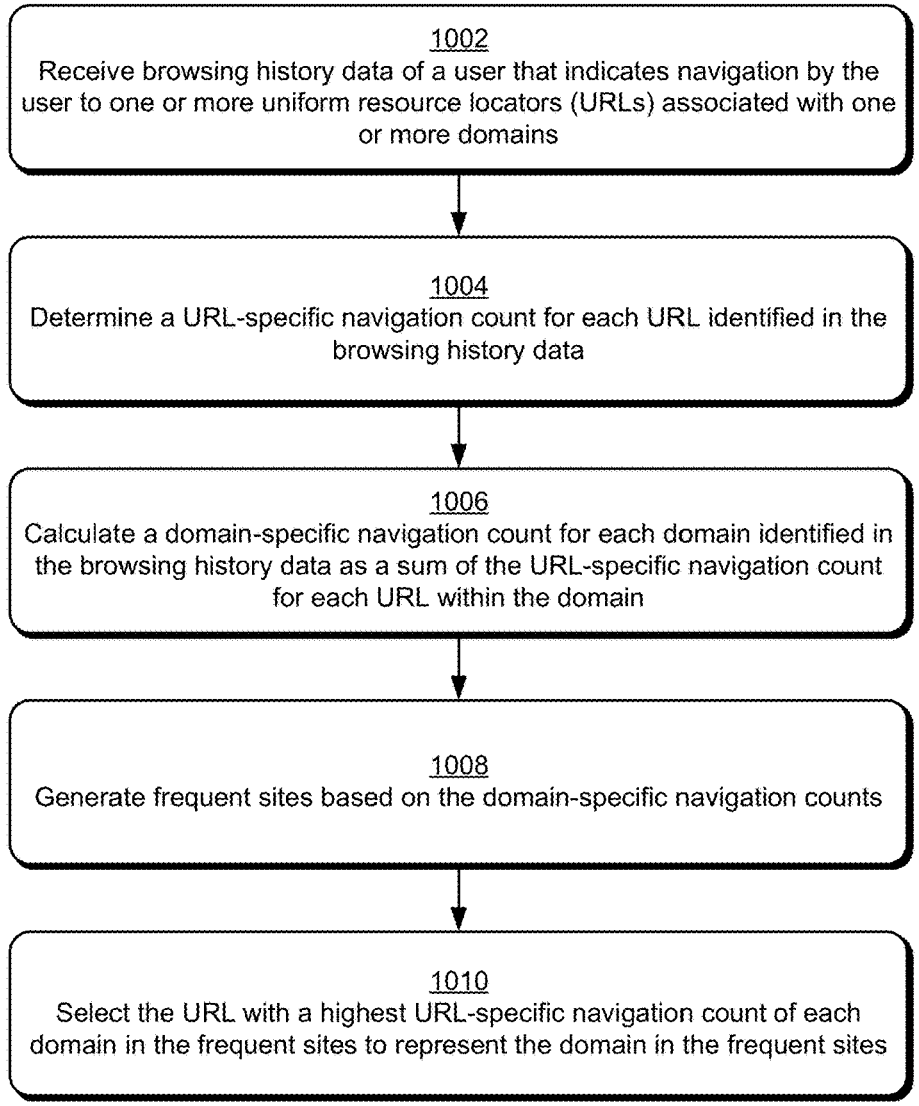
FIG. 10 is an additional flow diagram that describes steps in a method in accordance with one or more embodiments.

FIG. 10 illustrates a flow diagram depicting an example method 1000 for generating domain-specific frequent sites. Step 1002 receives browsing history data of a user that indicates navigation by the user to one or more URLs associated with one or more domains.

Step 1004 determines a URL-specific navigation count for each URL identified in the browsing history data. In some cases, the URL-specific navigation count can be determined using user-engagement data that indicates engagement by the user with URLs identified in the browsing history data.

Step 1006 calculates a domain-specific navigation count for each domain identified in the browsing history data as a sum of the URL-specific navigation count for each URL within the domain, and step 1008 generates frequent sites based on the domain-specific navigation counts.

Step 1010 selects the URL with the highest URL-specific navigation count of each domain in the frequent sites for display in the frequent sites. For example, the URL with the highest URL-specific navigation count of all URLs within a domain is selected to represent the domain in the frequent sites.

Figure 11:
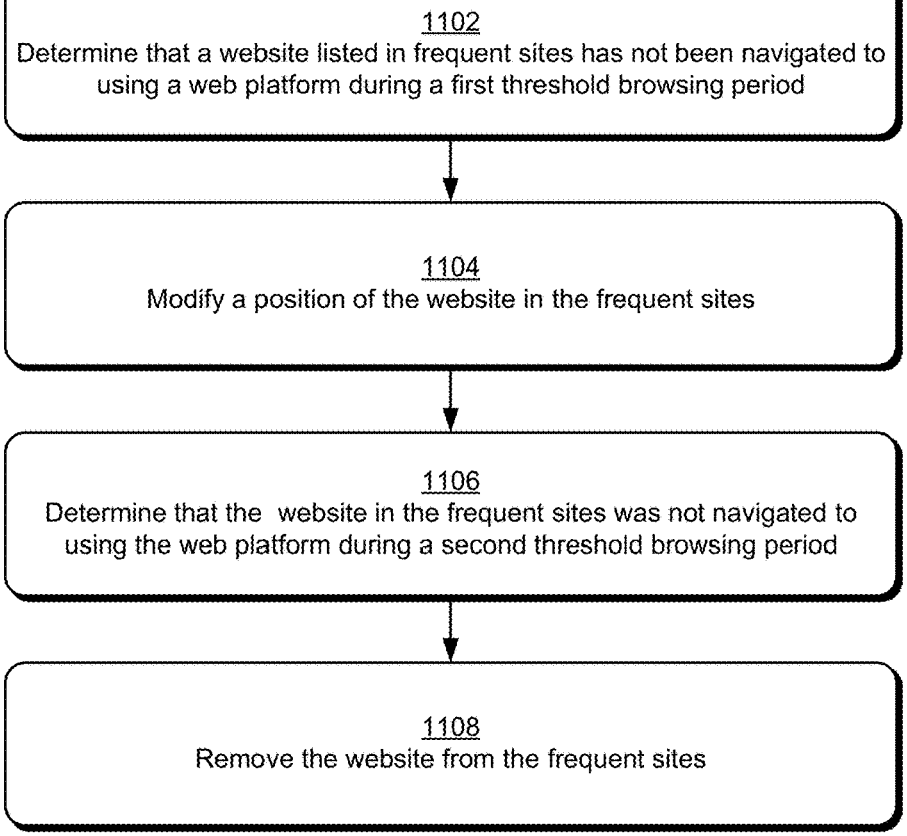
FIG. 11 is an additional flow diagram that describes steps in a method in accordance with one or more embodiments.

FIG. 11 illustrates a flow diagram depicting an example method 1100 for decaying frequent sites. Step 1102 determines that a website listed in frequent sites has not been navigated to using a web platform during a first threshold browsing period. The first threshold browsing period, for example, may correspond to 1 browsing day.

Step 1104 modifies a position of the website in the frequent sites responsive to determining that the website was not navigated to during the first threshold browsing period. For example, if the website was listed first in the frequent sites, the frequent sites may be modified so that the website is now listed second in the frequent sites. To modify the position of the website in the frequent sites, frequent sites module 106 may decay a navigation count of the website. Steps 1102 and 1104 may be repeated during multiple first threshold browsing periods. For example, frequent sites module 106 may move the website down a position in the frequent sites for each browsing day during which the website is not navigated to by the user using web platform 104.

Step 1106 determines that the website in the frequent sites was not navigated to using the web platform during a second threshold browsing period. The second threshold browsing period may be greater than the first threshold browsing period. For example, the second threshold browsing period may correspond to 7 browsing days or 14 browsing days. In some cases, both the first threshold browsing period and the second threshold browsing period may be user customizable.

Step 1108 removes the website from the frequent sites responsive to determining that the website in the frequent sites was not navigated to using the web platform during the second threshold browsing period.

Having considered various embodiments, consider now a discussion of example device that can be utilized to implement the embodiments described above.

Example Device

Figure 12:
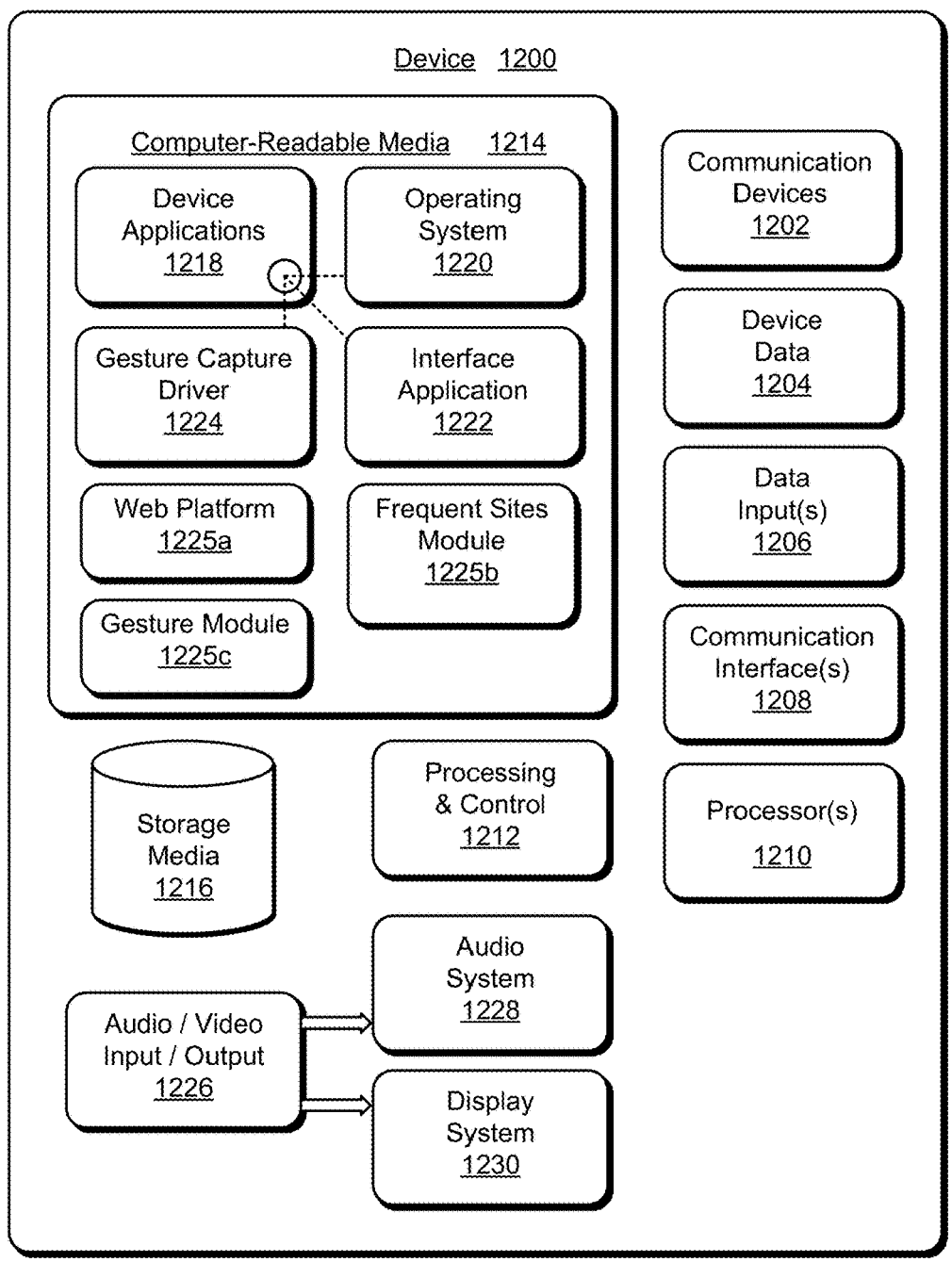
FIG. 12 illustrates an example system including various components of an example device that can be implemented as any type of computing device as described with reference to FIGS. 1 and 2 to implement various embodiments described herein.

FIG. 12 illustrates various components of an example device 1200 that can be implemented as any type of portable and/or computer device as described with reference to FIGS. 1 and 2 to implement embodiments described herein. Device 1200 includes communication devices 1202 that enable wired and/or wireless communication of device data 1204 (e.g., received data, data that is being received, data scheduled for broadcast, data packets of the data, etc.). Device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable or readable instructions to control the operation of device 1200 and to implement the embodiments described above. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store device data 1204, as well as various device applications 1218 and any other types of information and/or data related to operational aspects of device 1200. For example, an operating system 1220 can be maintained as a computer application with computer-readable media 1214 and executed on processors 1210. Device applications 1218 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. Device applications 1218 also include any system components or modules to implement embodiments of the techniques described herein. In this example, device applications 1218 include an interface application 1222 and a gesture-capture driver 1224 that are shown as software modules and/or computer applications. Gesture-capture driver 1224 is representative of software that is used to provide an interface with a device configured to capture a gesture, such as a touchscreen, track pad, camera, and so on. Alternatively or in addition, interface application 1222 and gesture-capture driver 1224 can be implemented as hardware, software, firmware, or any combination thereof. In addition, computer readable media 1214 can include a web platform 1225a, a frequent sites module 1225b, and a gesture module 1225c that function as described above.

Device 1200 also includes an audio and/or video input-output system 1226 that provides audio data to an audio system 1228 and/or provides video data to a display system 1230. Audio system 1228 and/or display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, audio system 1228 and/or display system 1230 are implemented as external components to device 1200. Alternatively, audio system 1228 and/or display system 1230 are implemented as integrated components of example device 1200.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device, comprising:
one or more processors; and
a memory comprising instructions stored thereon that, responsive to execution by the one or more processors, implements a web platform that performs operations comprising:
maintaining, at the computing device, a local browsing history of the computing device, wherein the local browsing history comprises user engagement data of a user's interactions with websites browsed to on the computing device, the user's interactions comprising one or more of: clicking on links on the websites, typing data into data entry fields on the websites, scrolling the websites, watching videos on the websites, or listening to audio on the websites;
receiving, over a network from a frequent sites module, multiple-device frequent sites associated with the user, the multiple-device frequent sites generated for the user based on the user's aggregated browsing history via the computing device and at least one additional computing device, wherein the user's aggregated browsing history comprises user engagement data of the user's interactions with websites browsed to on the computing device and at least one additional computing device, the user's interactions comprising one or more of: clicking on links on the websites, typing data into data entry fields on the websites, scrolling the websites, watching videos on the websites, or listening to audio on the websites;
modifying the multiple-device frequent sites using the local browsing history of the computing device to generate device-specific frequent sites corresponding to the user, the modifying comprising altering the multiple-device frequent sites such that one or more websites navigated to on the computing device and included in the local browsing history are listed ahead of websites in the multiple-device frequent sites that have not been navigated to on the computing device, and wherein modifying the multiple-device frequent sites to generate the device-specific frequent sites further comprises applying a weight to websites listed in the multiple-device frequent sites which have been navigated to on the computing device to cause the websites that have been navigated to on the computing device to be listed higher in the device-specific frequent sites than websites that have not been navigated to on the computing device;
causing the device-specific frequent sites to be rendered in a frequent sites user interface container of the web platform by displaying selectable representations of each website in the device-specific frequent sites, each of the selectable representations selectable to initiate navigation to the respective website via the web platform; and
responsive to user input to select one of the selectable representations of the device-specific frequent sites:
causing navigation to a respective website associated with the selected representation via the web platform; and
updating the multiple-device frequent sites by communicating, over the network to the frequent sites module, an indication of the navigation to the respective website associated with the selected representation.

2. The computing device of claim 1, wherein the multiple-device frequent sites are generated for the user based on at least a first browsing history associated with the computing device and at least a second browsing history associated with the at least one additional computing device, and wherein the local browsing history of the computing device corresponds to the first browsing history associated with the computing device but does not include the second browsing history.

3. The computing device of claim 1, wherein the device-specific frequent sites include at least one website that is not included in the multiple-device frequent sites.

4. A computer-implemented method comprising:
maintaining, at a computing device, a local browsing history of the computing device, wherein the local browsing history comprises user engagement data of a user's interactions with websites browsed to on the computing device, the user's interactions comprising one or more of: clicking on links on the websites, typing data into data entry fields on the websites, scrolling the websites, watching videos on the websites, or listening to audio on the websites;
receiving, at the computing device over a network from a frequent sites module, multiple-device frequent sites associated with the user, the multiple-device frequent sites generated for the user based on the user's aggregated browsing history via the computing device and at least one additional computing device, wherein the user's aggregated browsing history comprises user engagement data of the user's interactions with websites browsed to on the computing device and the at least one additional computing device, the user's interactions comprising one or more of clicking on links on the websites, typing data into data entry fields on the websites, scrolling the websites, watching videos on the websites, or listening to audio on the websites;
modifying the multiple-device frequent sites using the local browsing history of the computing device to generate device-specific frequent sites corresponding to the user, the modifying comprising applying a weight to websites listed in the multiple-device frequent sites which have been navigated to on the computing device to cause the websites that have been navigated to on the computing device to be listed higher in the device-specific frequent sites than websites that have not been navigated to on the computing device but have been navigated to on at least one of the additional computing devices;
causing the device-specific frequent sites to be rendered in a frequent sites user interface container of a web platform by displaying selectable representations of websites in the device-specific frequent sites, each of the selectable representations selectable to initiate navigation to the respective website via the web platform; and responsive to user input to select one of the selectable representations of the device-specific frequent sites, causing navigation to a respective website associated with the selected representation via the web platform.

5. The computer-implemented method of claim 4, wherein the multiple-device frequent sites are generated for the user based on at least a first browsing history associated with the computing device and at least a second browsing history associated with the at least one additional computing device, and wherein the local browsing history of the computing device corresponds to the first browsing history associated with the computing device but does not include the second browsing history.

6. The computer-implemented method of claim 4, wherein the device-specific frequent sites include at least one website that is not included in the multiple-device frequent sites.

7. A computer-readable storage device comprising instructions stored thereon that, responsive to execution by a processor of a computing device, perform operations comprising:

maintaining, at the computing device, a local browsing history of the computing device, wherein the local browsing history comprises user engagement data of a user's interactions with websites browsed to on the computing device, the user's interactions comprising one or more of: clicking on links on the websites, typing data into data entry fields on the websites, scrolling the websites, watching videos on the websites, or listening to audio on the websites;

receiving, over a network, multiple-device frequent sites associated with the user, the multiple-device frequent sites generated for the user based on the user's browsing history via multiple computing devices, wherein the user's browsing history via multiple computing devices comprises user engagement data of the user's interactions with websites browsed to on the multiple computing devices, the user's interactions comprising one or more of: clicking on links on the websites, typing data into data entry fields on the websites, scrolling the websites, watching videos on the websites, or listening to audio on the websites;

modifying the multiple-device frequent sites using the local browsing history of the computing device to generate device-specific frequent sites corresponding to the user by listing, in the multiple-device frequent sites, websites with a local navigation count above a certain threshold ahead of websites that have not been navigated to using the computing device, the local navigation count based on user navigation to a respective website on the computing device but not to the respective website on at least one of the other multiple computing devices;

causing the device-specific frequent sites to be rendered in a frequent sites user interface container of a web platform by displaying selectable representations of each website in the device-specific frequent sites, each of the selectable representations selectable to initiate navigation to the respective website via the web platform; and responsive to user input to select one of the selectable representations of the device-specific frequent sites, causing navigation to a respective website associated with the selected representation via the web platform.

8. The computer-readable storage device of claim 7, wherein the multiple-device frequent sites are generated for the user based on at least a first browsing history associated with the computing device and at least a second browsing history associated with the at least one additional computing device, and wherein the local browsing history of the computing device corresponds to the first browsing history associated with the computing device but does not include the second browsing history.

9. The computer-readable storage device of claim 7, wherein the device-specific frequent sites include at least one website that is not included in the multiple-device frequent sites.

10. The computing device of claim 1, wherein the communicating the indication causes the frequent sites module to update the multiple-device frequent sites by adjusting engagement data for the respective website by increasing a navigation count of the respective website.

11. The computing device of claim 1, wherein responsive to the user input to select one of the selectable representations of the device-specific frequent sites, the operations further comprise increasing a navigation count for the respective website in the device-specific frequent sites.

12. The computing device of claim 1, wherein the modifying the multiple-device frequent sites to generate the device-specific frequent sites further comprises listing, in the multiple-device frequent sites, websites with a local navigation count above a certain threshold ahead of websites that have not been navigated to using the computing device.

13. The computing device of claim 1, wherein the modifying causes an order of websites listed in the device-specific frequent sites of the computing device to be different than a respective order of websites listed in additional device-specific frequent sites of the additional computing device.

* * * * *